US006507802B1

(12) United States Patent
Payton et al.

(10) Patent No.: US 6,507,802 B1
(45) Date of Patent: Jan. 14, 2003

(54) MOBILE USER COLLABORATOR DISCOVERY METHOD AND APPARATUS

(75) Inventors: David W. Payton, Woodland Hills, CA (US); Mike Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/505,266

(22) Filed: Feb. 16, 2000

(51) Int. Cl.[7] ................................................ G06F 15/00

(52) U.S. Cl. ....................... 702/150; 702/188; 702/189; 706/10; 706/11

(58) Field of Search ............................ 702/94, 95, 127, 702/108, 150–153, 179, 183, 187, 188; 705/7, 10, 14, 37, 108–111; 701/210–212, 10–11; 706/14

(56) References Cited

U.S. PATENT DOCUMENTS 3,953,111 A * 4/1976 Fisher et al. ................ 350/189
5,704,017 A * 12/1997 Heckerman et al. .......... 395/61
5,868,637 A * 2/1999 Poxon ........................ 473/469
6,317,718 B1 * 11/2001 Fano ............................. 705/1
6,321,179 B1 * 11/2001 Glance et al. .............. 702/189

FOREIGN PATENT DOCUMENTS

EP 0899690 3/1999
EP 0899690 A2 * 3/1999 ........... G06T/15/00
WO WO 9961967 A 12/1999

OTHER PUBLICATIONS

Payton et al: "Dynamic Collaborator Discovery in Information Intensive Environments", ACM Computing Surveys, 'Online' vol. 31, No. 2es, 19999 pages article–8, XP002169231 Retrieved from Internet <URL:http://www.acm.org/pubs/citations/journals/surveys/payton/>.*

Maglio et al: "Suitor: An Attentive Information System", Proceedings of ACM Conference on Intelligent User Interfaces 'IUI–2000', Jan. 9–12, 2000, XP002169232 New Orleans, LA US.*

Starker et al: "A Gaze–Responsive Self–Disclosing Display", Proceedings of ACM Conference on Human Factors in Computing Systems, 'CHI' 90', Apr. 1990, pp. 3–9, XP002068006.*

Hill et al: "Edit Wear and Read Wear" Proceedings o fACM Conference on Human Factors in Computing Systems 'CHI' 92!May 3–7, 1992, pp. 3–9 XP000426806 New York City, NY.

Fano, A. E. "Shopper's Eye: Using Location–based Filtering for a Shopping Agent in the Physical World" ACM Press. 1998, pp. 416–421.

* cited by examiner

*Primary Examiner*—Bryan Bui
(74) *Attorney, Agent, or Firm*—Tope-McKay + Associates

(57) ABSTRACT

A mobile user collaborator discovery method and system that tracks and correlates user position and gaze direction information in a physical environment in order to determine common interests. The physical environment is represented by an array divided into a plurality of elements, each representing a particular physical area of the environment. The mobile user collaborator discovery method and system includes an activity monitor to track user position and gaze direction information, an entry processor to process the user position and gaze direction information to determine the elements of the array corresponding to physical areas viewed by the user, and to provide the information to a match database, and a matcher to correlate information regarding elements of the array corresponding to physical areas viewed by the user in order to determine portions of the array representing areas of common interest to the users.

50 Claims, 14 Drawing Sheets

Correlations Array

| User ID X | User ID Y | Short-Term Scent Score | Long-Term Scent Score | Long-Term to Short-Term Scent Score |
|---|---|---|---|---|
| • • • | • • • | • • • | • • • | • • • |

FIG. 7

Linkage Table

| Source Object ID | Destination Object ID | Linkage Strength |
| --- | --- | --- |
| • • • | • • • | • • • |

FIG. 8

Field-of-View Cone Superimposed on Scent Array

Field-of-View Cone Superimposed on Scent Array

MOBILE USER COLLABORATOR DISCOVERY METHOD AND APPARATUS

BACKGROUND OF THE INVENTION (1) Field of the Invention

The present invention is related to real-time location and positioning systems as well as to real-time communication of location and position-related data among multiple system users. More specifically, this disclosure presents a method and an apparatus for determining common interests among multiple system users by correlating direction vectors and direction fields supplied by the users.

(2) Background of the Invention

Systems for assisting the coordination of activities based on common interests, or on the focus toward a common goal, have long been in existence. These systems and their respective embodiments include a wide variety of techniques and apparatuses, and vary widely in their particular goals. For example, common interest determination has long been performed through the use of explicit statements of interests or by survey. Recently, many interest correlation systems have been developed for common interest determination over a computer network such as the Internet. Common interest determination systems range from those requiring an explicit input of interests, similar to a survey, to those that automatically correlate user activity patterns. In addition to these interest correlation systems, which operate by means such as tracking user activities on a computer system; tracking the items which a person has checked out at a point of purchase such as a store or a library; or analyzing explicit user input such as by survey, there is also a need to track and correlate the physical activity of a group of people. These activities may be tracked in terms of user visual patterns. Historically, the determination of common interests in a three-dimensional space involved the passage of information explicitly through such means as speech, radio communication, and gestures. One example of an activity coordination system based on common interests, or the focus toward a common goal, is that involving a small unit military operation requiring coordination among a dispersed group of individuals, such as a SWAT team, where coordination among a dispersed group of individuals is critical. Unfortunately, historical forms of information exchange suffer from several important drawbacks. First, oral communication may be undesirable in situations where a significant distance separates soldiers, as vocal noise may reveal their location, or simply may not be feasible. Second, radio communication, while suffering, to some degree, from the same noise-related problems as oral communication, introduces the need to consciously utilize a piece of equipment that may detract from the user's ability to concentrate on the task at hand. Third, in order to interpret and decipher hand signals, the soldiers must be within a close, line of sight proximity of one another. Fourth, with all of these forms of communication there exists an inherent barrier to communication because of the need to orally or symbolically describe an object of interest. Fifth, the need to communicate orally or symbolically also leads to a communication lag time, which may lessen the effectiveness of a team, and may even place them in danger. Similar difficulties exist in situations involving police work, fire fighting, search and rescue, and in military-type gaming situations. In some situations, particularly with regard to firefighting, the problem is often further complicated by the fact that physical equipment may preclude the ability to communicate orally.

This problem exists in any situation where oral communication is impossible, such as with the use of gas masks, or even in underwater operations involving the use of breathing equipment such as that used by SCUBA divers.

Therefore, it is an object of the present invention to overcome these difficulties by providing a means for correlating direction vectors generated based on a physical direction tracked by a device such as a hand-held pointer or mounted pointing device such as a gun sight or a helmet-mounted vision-tracking device. The system correlates these vectors to determine intersections in three-dimensional space, which indicate spatial regions of common interest.

References

"Digital Image Processing Techniques", p. 257–287, Ed. By M. P. Ekstrom, Academic Press, Inc. (1984).

SUMMARY OF THE INVENTION

It is an object of the present invention to provide mobile user collaborator discovery method and system that tracks and correlates user position and gaze direction information in a physical environment in order to determine common interests. The physical environment is represented by an array divided into a plurality of elements, each representing a particular physical area of the environment. The array may be overlaid with information regarding the specific geography of an area including features and landmarks. The mobile user collaborator discovery method and system includes an activity monitor to track user position and gaze direction information, an entry processor to process the user position and gaze direction information to determine the elements of the array corresponding to physical areas viewed by the user, and to provide the information to a match database, and a matcher to correlate information regarding elements of the array corresponding to physical areas viewed by the user in order to determine portions of the array representing areas of common interest to the users. The method and system tracks areas of long-term and short-term interest to users by tracking the length of time and the number of times an individual has viewed a particular area. The method and system also provides a means for decaying the level of a particular user's interest for a particular element over time, and eliminating the association between a particular user and a particular element in the array once the level of interest has become sufficiently decayed, thereby clearing the match database of unnecessary entries. Furthermore, the method and system may provide a means for communication between users, such as an electronic display, so that users can determine common interests either among other members of the group or between a particular user and others sharing common interests with the particular user.

More specifically, the method for mobile user collaborator discovery among a plurality of users viewing portions of an area comprises the steps of:

(a) collecting a set of user views for the plurality of users, with the set of user views including a plurality of entries, with each entry including a user identity associated with a particular one of the plurality of users, a location within the area for the particular one of the plurality of users, and a view direction including a portion of the area for the particular one of the plurality of users;

(b) uniquely associating at least one scent score from the location of the particular one of the plurality of users to a portion of the area included in the view direction of the particular one of the plurality of users;

(c) storing the at least one scent score from step (b), along with information regarding the identification of the user with which the at least one scent score that was associated in step (b), in a computer memory; and (d) determining a set of scent match scores by correlating the scent scores from at least a portion of the plurality of users to provide a set of users sharing points of common viewing as determined by overlaps in the areas for which scent scores were associated in step (b), whereby overlapping user views are utilized to determine a set of users which have viewed portions of the area in common.

The collecting step may be performed by monitoring and recording the real-time locations and view directions of the plurality of users, and the view direction of each of the plurality of users is in the form of a field-of-view cone having a vertex at the location of, and being centered along, the view direction of the particular one of the plurality of users, whereby the field-of view cone simulates the field-of-view of the user with respect to the area along the view direction. The method may also include the step of filtering the user views to eliminate undesirable user views from the set of user views. The scent scores may be represented by scalar values, increased for each particular user in proportion to the number of times a particular portion of the area is included in the direction of view of the particular user. The increase of the scent scores may be such that each particular scent score never exceeds a predetermined maximum value, thereby providing a saturation point so that the scent scores do not continue to increase indefinitely. The users may be provided with the correlated information regarding each other so that they can determine others sharing their interests, and may also be provided with a messaging system so that they may interact.

The scent score map may consist of objects, a two-dimensional array mapped onto a physical area, a three-dimensional array mapped onto a physical area or a hybrid array having objects or a two-dimensional map with portions including a vertical array. The hybrid embodiment is considered preferred, and provides the benefits of a three-dimensional array with minimal computational impact. The vertical array may be developed on the fly for objects or areas that generate a high degree of interest, as measured by scent scores. The increments into which the vertical array is divided may be adapted situationally. Furthermore, objects or portions of the scent score map may be linked based on their similarity, so that the scent scores in the linked portions accumulate together. For example, in an application involving a museum, certain types of objects such as paintings by a particular artist may be linked so that interest generated for one represents a likely interest in another. The objects in the scent array may be modeled such that they act as obstructions to prevent scent scores from accumulating for objects that are out of view to a particular user due to blockage by other objects.

The short-term scent score and long-term scent scores may be associated with each particular user according to the following, $$SS=CS$$

$$SL=CL$$

where SS represents the short-term scent score, SL represents the long-term scent score, and CS and CL are scalar values chosen as scent score values assigned for the first access of a particular item by a particular user; wherein the short-term scent score and the long-term scent score are increased according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL; and wherein the decay is performed according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

The correlation of the scent scores between a user a, representing a particular one of the plurality of users, and a user b, representing another of the plurality of users, where item p represents a particular area for which a scent score has been associated, may be performed by the following, which takes into account a vertical array as well as a horizontal, $$\text{SS\_Match}_{ab_{hybrid}} = \frac{\phi\sum_p \frac{SS_{ap}\times SS_{bp}}{Stot_p}}{\sqrt{\sum_p SS_{ap}^2}\times\sqrt{\sum_p SS_{bp}^2}} + \frac{(1-\phi)\sum_v \frac{SS_{av}\times SS_{bv}}{Stot_p}}{\sqrt{\sum_p SS_{av}^2}\times\sqrt{\sum_p SS_{bv}^2}},$$

$$\text{LL\_Match}_{ab_{hybrid}} = \frac{\phi\sum_p \frac{SL_{ap}\times SL_{bp}}{Stot_p}}{\sqrt{\sum_p SL_{ap}^2}\times\sqrt{\sum_p SL_{bp}^2}} + \frac{(1-\phi)\sum_v \frac{SL_{av}\times SL_{bv}}{Stot_p}}{\sqrt{\sum_p SL_{av}^2}\times\sqrt{\sum_p SL_{bv}^2}}, \text{ and}$$

$$\text{SL\_Match}_{ab_{hybrid}} = \frac{\phi\sum_p \frac{SS_{ap}\times SL_{bp}}{Stot_p}}{\sqrt{\sum_p SS_{ap}^2}\times\sqrt{\sum_p SL_{bp}^2}} + \frac{(1-\phi)\sum_v \frac{SS_{av}\times SL_{bv}}{Stot_p}}{\sqrt{\sum_p SS_{av}^2}\times\sqrt{\sum_p SL_{bv}^2}};$$

where:

$\text{SS\_Matchab}_{hybrid}$ is the match between the short-term scent scores of users a and b;

$\text{LL\_Matchab}_{hybrid}$ is the match between the long-term scent scores of users a and b;

$\text{SL\_Matchab}_{hybrid}$ is the match between the short-term scent score of user a and the long-term scent score of user b;

$\Phi$ is an inclusion factor ranging from 0 to 1, which allows the importance of the vertical scent array elements to be allocated in a weighted manner;

$Stot_p$ and $Stot_v$ are the total number of distinct user scent scores that can be found in the particular array element p and in the particular vertical array element v, respectively;

$SS_{ap}$ and $SS_{av}$ represent the short-term scent score scalars assigned to user a in the particular portion of the particular array element p and in the particular vertical array element v, respectively;

$SL_{ap}$ and $SL_{av}$ represent the long-term scent score scalars assigned to user a in the particular portion of the particular array element p and in the particular vertical array element v, respectively;

$SS_{bp}$ and $SS_{bv}$ represent the short-term scent score scalars assigned to user b in the particular portion of the particular array element p and in the particular vertical array element v, respectively; and $SL_{bp}$ and $SL_{bv}$ represent the long-term scent score scalars assigned to user b in the particular portion of the particular array element p and in the particular vertical array element v, respectively.

The above correlation may also be adapted to a two-dimensional-only case as follows, $$SS\_Match_{ab} = \frac{\sum_p \frac{SS_{ap} \times SS_{bp}}{Stot_p}}{\sqrt{\sum_p SS_{ap}^2}\sqrt{\sum_p SS_{bp}^2}},$$

$$SL\_Match_{ab} = \frac{\phi\sum_p \frac{SS_{ap} \times SL_{bp}}{Stot_p}}{\sqrt{\sum_p SS_{ap}^2}\sqrt{\sum_p SL_{bp}^2}}, \text{ and}$$

$$LL\_Match_{ab} = \frac{\phi\sum_p \frac{SL_{ap} \times SL_{bp}}{Stot_p}}{\sqrt{\sum_p SL_{ap}^2}\sqrt{\sum_p SL_{bp}^2}}, \text{ where}$$

$SS\_Match_{ab}$ is the match between short-term scent scores of user a and user b;

$SL\_Match_{ab}$ is the match between the short-term scent score of user a and the long-term scent score of user b;

$LL\_Match_{ab}$ is the match between the long-term scent scores of users a and b;

$Stot_p$ is the total number of distinct user scent scores that can be found at area p;

$SS_{ap}$ is the short-term scent score assigned to user a at area p; and $SL_{ap}$ is the long-term scent score assigned to user a at area p.

The system for mobile user collaborator discovery of the present invention includes:

(a) at least one activity monitor for collecting a set of user views for the plurality of users, with the set of user views including a plurality of entries, with each entry including a user identity associated with a particular one of the plurality of users, a location within the area for the particular one of the plurality of users, and a view direction including a portion of the area for the particular one of the plurality of users;

(b) an entry processor connected to the activity monitor to receive the set of user views for the plurality of users, said entry processor operative to uniquely associate at least one scent score from the location of the particular one of the plurality of users to a portion of the area included in the view direction of the particular one of the plurality of users;

(c) a match database connected to the entry processor to receive and store the at least one scent score, along with information regarding the identification of the user with which the at least one scent score was associated; and (d) a matcher connected to the match database to receive the at least one scent score, along with the information regarding the identification of the user with which the at least one scent score was associated, and to correlate the scent scores from at least a portion of the plurality of users to provide a set of users sharing points of common viewing as determined by overlaps in the areas for which the scent scores were associated by the entry processor, whereby overlapping user views are used to determine a set of users which have viewed portions of the area in common.

The activity monitor may monitor and record the real-time locations and view directions of the plurality of users, and the view direction of each of the plurality of users is in the form of a field-of-view cone having a vertex at the location of, and being centered along, the view direction of the particular one of the plurality of users, whereby the field-of view cone simulates the field-of-view of the user with respect to the area along the view direction. The system may also include a means for filtering the user views to eliminate undesirable user views from the set of user views. The scent scores may be represented by scalar values, increased for each particular user in proportion to the number of times a particular portion of the area is included in the direction of view of the particular user. A means may be provided whereby the increase of the scent scores never exceeds a predetermined maximum value, thereby providing a saturation point so that the scent scores do not continue to increase indefinitely. The users may be provided with the correlated information regarding each other so that they can determine others sharing their interests, and may also be provided with a messaging system so that they may interact.

The scent score map may consist of objects, a two-dimensional array mapped onto a physical area, a three-dimensional array mapped onto a physical area or a hybrid array having objects or a two-dimensional map with portions including a vertical array. The hybrid embodiment is considered preferred, and provides the benefits of a three-dimensional array with minimal computational impact. The vertical array may be developed on the fly for objects or areas that generate a high degree of interest, as measured by scent scores. The increments into which the vertical array is divided may be adapted situationally. Furthermore, objects or portions of the scent score map may be linked based on their similarity, so that the scent scores in the linked portions accumulate together. For example, in an application involving a museum, certain types of objects such as paintings by a particular artist may be linked so that interest generated for one represents a likely interest in another. The objects in the scent array may be modeled such that they act as obstructions to prevent scent scores from accumulating for objects that are out of view to a particular user due to blockage by other objects.

The scent scores may serve multiple purposes. For example, a long-term scent score and a short-term scent score may be used such that the short-term scent score and long-term scent score for the particular viewer associated with the particular area are increased for each subsequent time the particular area lies along the view direction of the particular user, such that the short-term scent score increases more rapidly than the long-term scent score. The scent scores may also be decayed over time to reflect changing user interests. The decay may be adjusted to be faster in the case of a short-term scent score and slower in the long-term scent score.

The short-term scent score and long-term scent scores may be associated with each particular user according to the following, $$SS=CS$$

$$SL=CL$$

where SS represents the short-term scent score, SL represents the long-term scent score, and CS and CL are scalar values chosen as scent score values assigned for the first access of a particular item by a particular user; wherein the short-term scent score and the long-term scent score are increased according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL; and wherein the decay is performed according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

The correlation of the scent scores between a user a, representing a particular one of the plurality of users, and a user b, representing another of the plurality of users, where item p represents a particular area for which a scent score has been associated, may be performed by the following, which takes into account a vertical array as well as a horizontal, $$SS\_Match_{ab_{hybrid}} = \frac{\phi \sum_p \frac{SS_{ap} \times SS_{bp}}{Stot_p}}{\sqrt{\sum_p SS_{ap}^2} \times \sqrt{\sum_p SS_{bp}^2}} + \frac{(1-\phi)\sum_v \frac{SS_{av} \times SS_{bv}}{Stot_p}}{\sqrt{\sum_p SS_{av}^2} \times \sqrt{\sum_p SS_{bv}^2}},$$

$$LL\_Match_{ab_{hybrid}} = \frac{\phi \sum_p \frac{SL_{ap} \times SL_{bp}}{Stot_p}}{\sqrt{\sum_p SL_{ap}^2} \times \sqrt{\sum_p SL_{bp}^2}} + \frac{(1-\phi)\sum_v \frac{SL_{av} \times SL_{bv}}{Stot_p}}{\sqrt{\sum_p SL_{av}^2} \times \sqrt{\sum_p SL_{bv}^2}}, \text{ and;}$$

-continued where:

$SS\_Matchab_{hybrid}$ is the match between the short-term scent scores of users a and b;

$LL\_Matchab_{hybrid}$ is the match between the long-term scent scores of users a and b;

$SL\_Matchab_{hybrid}$ is the match between the short-term scent score of user a and the long-term scent score of user b;

$\Phi$ is an inclusion factor ranging from 0 to 1, which allows the importance of the vertical scent array elements to be allocated in a weighted manner;

$Stot_p$ and $Stot_v$ are the total number of distinct user scent scores that can be found in the particular array element p and in the particular vertical array element v, respectively;

$SS_{ap}$ and $SS_{av}$ represent the short-term scent score scalars assigned to user a in the particular portion of the particular array element p and in the particular vertical array element v, respectively;

$SL_{ap}$ and $SL_{av}$ represent the long-term scent score scalars assigned to user a in the particular portion of the particular array element p and in the particular vertical array element v, respectively;

$SS_{bp}$ and $SS_{bv}$ represent the short-term scent score scalars assigned to user b in the particular portion of the particular array element p and in the particular vertical array element v, respectively, and $SL_{bp}$ and $SL_{bv}$ represent the long-term scent score scalars assigned to user b in the particular portion of the particular array element p and in the particular vertical array element v, respectively.

The above correlation may also be adapted to a two-dimensional-only case as follows, $$SS\_Match_{ab} = \frac{\sum_p \frac{SS_{ap} \times SS_{bp}}{Stot_p}}{\sqrt{\sum_p SS_{ap}^2}\sqrt{\sum_p SS_{bp}^2}},$$

$$SL\_Match_{ab} = \frac{\phi \sum_p \frac{SS_{ap} \times SL_{bp}}{Stot_p}}{\sqrt{\sum_p SS_{ap}^2}\sqrt{\sum_p SL_{bp}^2}}, \text{ and}$$

$$LL\_Match_{ab} = \frac{\phi \sum_p \frac{SL_{ap} \times SL_{bp}}{Stot_p}}{\sqrt{\sum_p SL_{ap}^2}\sqrt{\sum_p SL_{bp}^2}}, \text{ where}$$

$SS\_Match_{ab}$ is the match between short-term scent scores of user a and user b;

$SL\_Match_{ab}$ is the match between the short-term scent score of user a and the long-term scent score of user b;

$LL\_Match_{ab}$ is the match between the long-term scent scores of users a and b;

$Stot_p$ is the total number of distinct user scent scores that can be found at area p;

$SS_{ap}$ is the short-term scent score assigned to user a at area p; and $SL_{ap}$ is the long-term scent score assigned to user a at area p.

These features as well as several specific embodiments of the present invention are described in the accompanying drawings and in the detailed description. The present invention is adaptable to many specific embodiments, and accordingly, the embodiments described herein are intended only as non-limiting examples, which provide the best mode contemplated by the inventors. Thus, the present invention is not intended to be limited to the embodiments shown, but is to be accorded the widest scope consistent with the principles and novel features disclosed herein.

BRIEF DESCRIPTION OF THE DRAWINGS

FIG. 7 provides an example correlations array component of the match database;

FIG. 8 provides an example linkage table of the diffusion engine/linkage array component of the matcher of the first specific embodiment of the present invention shown in FIG. 4;

DETAILED DESCRIPTION

Figure 1:
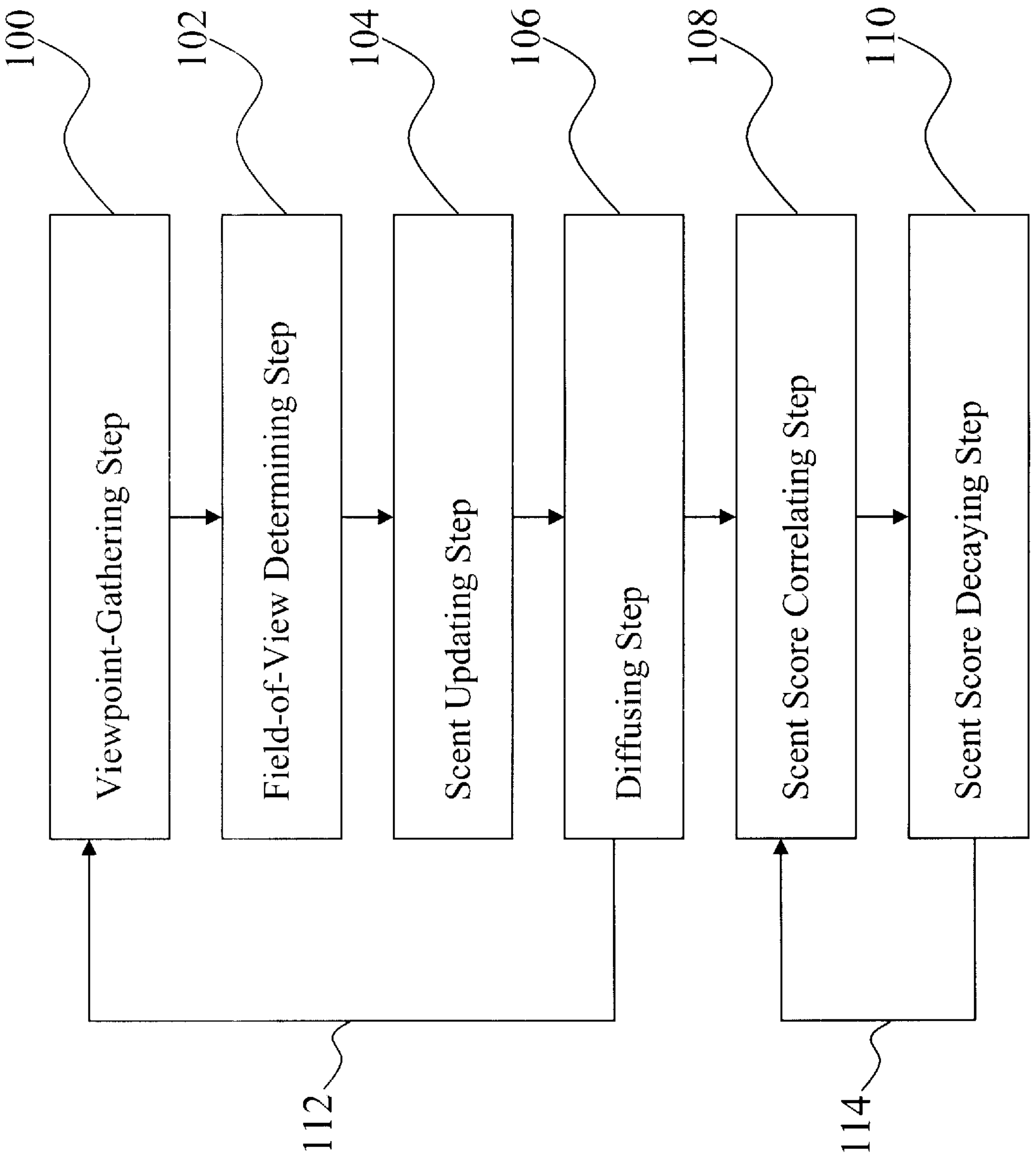
FIG. 1 provides an overview of the general steps of the present invention.

The present invention is useful for providing mobile users with the ability to locate other mobile users with common interests. For purposes of this description, the term "collaborators" will be used to designate mobile users having common interests in specific regions. The following description is presented to enable one of ordinary skill in the art to make and use the invention, which may be incorporated in the context of a variety of applications. Various modifications to the preferred embodiment, as well as a variety of uses in different applications will be readily apparent to those skilled in the art. Notably, the general principles defined herein may be applied to other embodiments. Thus, the present invention is not intended to be limited to the embodiments shown, but is to be accorded the widest scope consistent with the principles and novel features disclosed herein.

The present invention is applicable to any situation involving the correlation of user interests in a three-dimensional realm, and may find application in many different situations, including real-space situations such as those involving police work, fire fighting, search and rescue, and military-type gaming. In addition to emergency-type situations, the present invention may be useful in marketing applications such as determining the effectiveness of a product display; e.g. the layout of a department store or a museum. Furthermore, the present invention may also be applied in computerized settings such as three-dimensional simulations and games. Additionally, the present invention may be utilized in other applications such as the determination of the common interests of animals in research or in emergency activities such as search and rescue operations.

As previously stated, it is an object of the present invention to provide a method and apparatus for correlating direction vectors generated based on a physical direction provided by a pointing device such as a hand-held pointer or mounted pointing device such as a telescopic sight or a helmet-mounted vision-tracking device. The system correlates these vectors to determine intersections in three-dimensional space, which indicate spatial regions of common interest. Another object of the present invention is to determine users having common interests through the passive acquisition of data without any form of explicit input from the individuals involved. Instead, all data is to be acquired as a byproduct of people's ordinary visual information gathering activities so as to minimize the impact the system has on people's time and attention.

Visual activity patterns can reveal a great deal about a person's interests and tastes. As a consequence, a commonality of visual activity patterns in a group of two or more individuals can reveal a commonality of interests between the individuals as well as indicate items that are particularly interesting to the members of the group. For example, if several people look at the same building or at the same display at a department store, there exists a possibility that these people have some interests in common. The strength of this common interest increases with an increase in the time spent looking at an item. Typically, the greater the number of people who view a particular object or area, the greater the likelihood that they share a common interest in the object.

The fact that a particular item viewed may not consciously be of great interest to a particular viewer is not critical. By attracting the attention of a number of viewers, it may be determined that there was something particularly worthy of attention, and its importance may be determined by the amount of attention it receives. This is important in the case of a store display, where the particular viewer's interest may not be as important as attracting a large number of viewers in order to generate consumer awareness. In this case, it may be important simply to utilize the system to allow for the determination of particular displays or features thereof that are attractive to customers' eyes. If the person felt there was something worthwhile in an item because of its appearance, the fact that a person looked at the item indicates it had the potential to be of interest.

A general embodiment of the method of the present invention involves several steps, as shown in FIG. 1. First, user position and gaze direction information is tracked through the use of a tracking device. This information is gathered and provided to the system in a viewpoint-gathering step 100. Second, in a field-of-view determining step 102, a field-of-view cone is generated based on the user position and gaze direction information in order to account for the area viewed. It is important to note at this point that the invention may vary from the simple correlation of the fields-of-view of multiple users to determine those having common interests; to including a set of pre-defined objects at selected locations; and to including a two or three-dimensional array representing the area surrounding a user. Third, in a scent-updating step 104, at least one "scent score" scalar value developed from user position and gaze direction information is entered into a scent score repository to track the viewed portion of the physical region surrounding the user (scent scores will be discussed in more detail further below). Briefly, the scent score is a means for indicating that a user has viewed a particular area or object, and may be visualized as analogous to the scent left by an animal as it walks through an area, with a greater amount of its scent being deposited in areas in which it showed a high degree of interest, i.e. areas where it stopped or rummaged around. The main departure from this analogy lies in the fact that the scent score generation by the user for the present invention is based on what the user has viewed, rather than on physical contact with the area. The "scent score" may be increased with the total amount of time or the total number of times a particular portion of the physical region has been within the area viewed by the user, and may also be decayed over time to ensure a degree of recency. The decaying is discussed below in conjunction with the scent score decaying step 110. Preferably, each viewed element is associated with a second scent score scalar value for each user. The same increasing and decaying operations are applied as were for the first scent score, except that the increasing operation is performed in smaller increments. For purposes of this description, the first scent score may be thought of as a short-term scent score because it is subject to greater fluctuation from recent viewings than the second scent score, which may be thought of as a long-term scent score. Although two scent scores are utilized for this description, the number and type of scent scores generated for a particular embodiment may vary depending on the specific application.

The repository in which the scent scores are stored may take many possible forms. For example, given a group of pre-defined objects at pre-set locations in the physical area surrounding a user, a unique scent score may be associated with each object. It may, also, on the other hand, consist of a more complex scent array structure such as a two or three-dimensional array, or a hybrid two/three dimensional array. Additionally, and optionally, a computerized map such as those utilized with global positioning systems (GPS) may be mapped onto the array, and certain groups of array elements may be linked such that scent scores accumulate in them uniformly or by a functional relationship. For example, when a particular item on an electronic map such as a building or other landmark is viewed, it may be desirable to treat all of the elements in the array which comprise the particular item as a single element or as closely related elements for scent increase and decay. Topological information from a map might also be used to more accurately model the field-of-view cone of a user by treating objects, whether man-made such as buildings or natural such as hills, as opaque in order to model obstructions into the field-of-view cone. Details of several specific embodiments of the scent score repository will be discussed further below.

A scent array embodiment may be envisioned as a grid or mesh of elements overlaid on a physical space. As a viewer looks in a particular direction, the "scent score", which represents the fact that the user has viewed a particular portion of the physical region represented by the elements of the array, is allocated to the elements of the array, which represent the area viewed. Fourth, after the scent-updating step 104, a diffusing step 106 is optionally performed. The diffusing step 106 may be used to diffuse the scent scores to other objects or array elements having some relationship to those viewed. For example, in the case of a simple object structure including groups of objects bearing some relationship to each other, such as groups of a particular species of flower dispersed through a garden, when one object of a particular group is viewed, the other objects in the group may also receive scent scores due to that relationship. Additionally, in the case of a scent array structure embodiment using a map with objects, the elements comprising an area of an object may be segmented together, and the scent scores for each may be diffused to them as a group. Fifth, after the optional diffusing step 106, a scent score-correlating step 108 is performed. In this step, match scores for pairs of individuals are obtained using the correspondence between their scent score scalar values. Sixth, after the scent score-correlating step 108, a scent score decaying step 110 is performed, in which the scent scores for all elements may be decayed as a function of elapsed time and their current values. This decay may follow any desired function, and may take the form of a linear degradation, half-life type degradation, or any other suitable form of degradation. Once the scent scores have become sufficiently decayed, they may be removed from memory. Note that in an embodiment having a short-term scent score, the decay operation is preferably performed more rapidly on the short-term scent score than on the long-term scent score. After the scent score-decaying step 110 is completed, each step in the method is performed repeatedly in order to provide for a continual update of the scent scores with changes in users' fields-of-view. Generally, the viewpoint-gathering step 100, the field-of view determining step 102, the scent-updating step 104, and the optional diffusing step 106 are repeated continuously in order to feed a continuous stream of data into the system. This repetition is illustrated by the first loop 112 shown in FIG. 1. The repetition of the scent score-correlating step 108, and the scent score-decaying step 110 may be performed with the same frequency as the steps within the first loop 112, or may be performed with a different frequency. This repetition is illustrated by the second loop 114 shown in FIG. 1. The exact manner in which the first loop 112 and the second loop 114 are repeated may be tailored to the specific needs of a particular embodiment. Generally, however, it is desirable to repeat the second loop 114 less frequently than the first loop 112 in order to minimize the computational requirements of the system.

Figure 2:
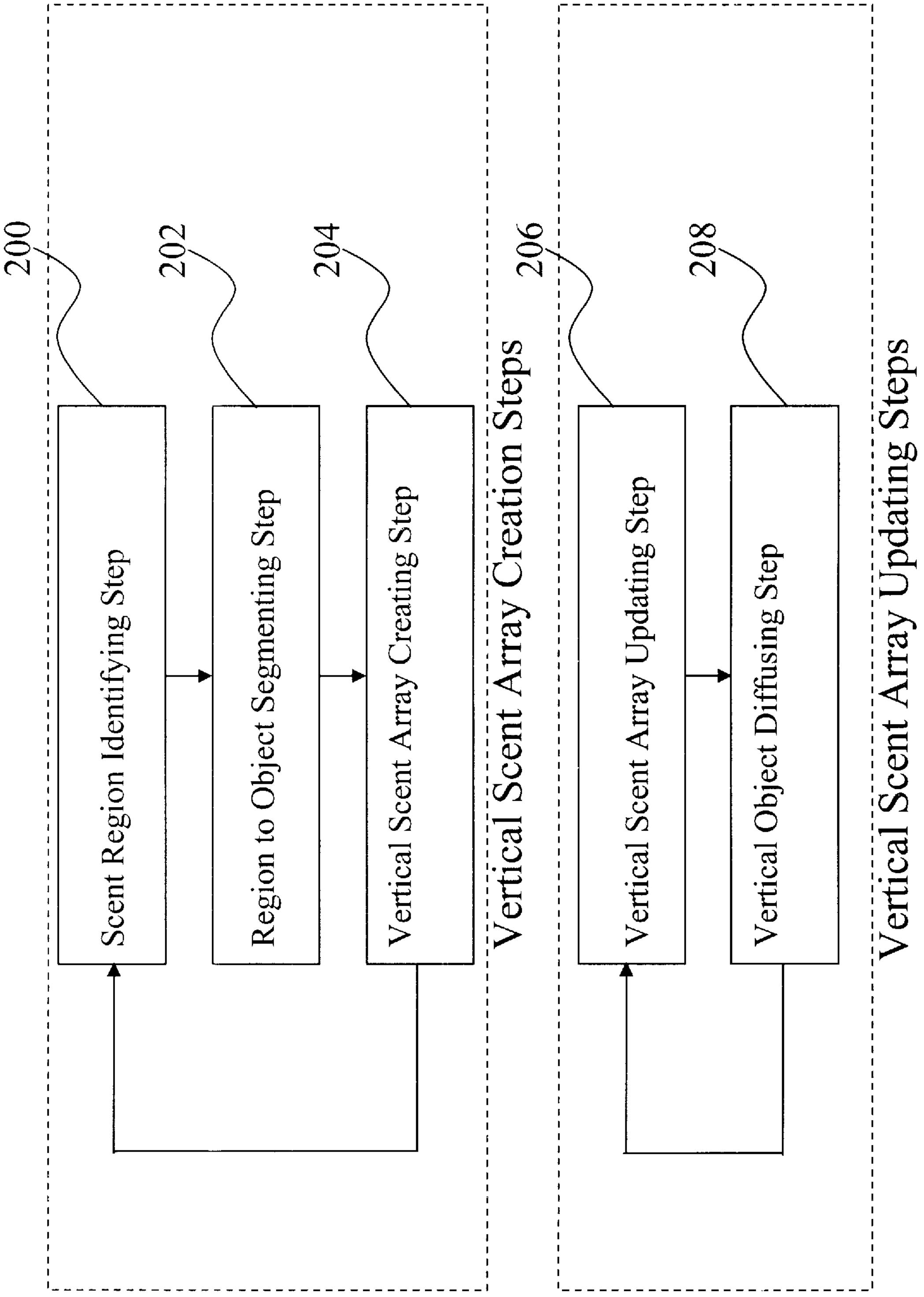
FIG. 2 provides an overview of the general steps in the vertical scent array creation and updating procedure of the present invention.

In the case where the scent score repository is a simple set of objects, or where it is a two or three-dimensional array, application of the method of the present invention, as shown in FIG. 1, is relatively straightforward, and is discussed in detail relative to several specific embodiments further below. However, in the case of a hybrid two/three dimensional scent array, a two-dimensional scent array of elements is developed to represent the physical space surrounding the user. As groups of elements are viewed together, they may be identified as objects, and segmented such that their scent scores rise and fall together. Optionally, a single scent score may replace all of the individual scent scores for a segmented object. In order to take into account the vertical aspect of the objects, vertical scent arrays are formed and updated using several additional steps, as shown in FIG. 2. These steps may be run in parallel with steps 104, 106, 108, and 110 of FIG. 1. The steps shown in FIG. 2 demonstrate the steps used for vertical scent array creation and for vertical scent array updating. It is important to note that the creation and update of a vertical scent array for an object may be done using different timeframes. Due to computational needs, for example, it may be desirable to identify objects and create vertical scent arrays for them less frequently than to update the scent scores in existing vertical scent array elements. The first of the vertical scent array creation steps is the scent region-identifying step 200, in which the array elements that are associated with an object are identified as related. This association may be inferred through user activity patterns or may be explicitly generated by use of pre-defined data such as a map. Second, a region-to-object segmenting step 202 is performed, in which the elements which comprise the object are grouped together and segmented as an object. An example of a simple segmentation routine is to collect all adjacent cells that have a scent score above a certain threshold. Numerous, and readily available methods for object segmentation exist and could be readily adapted for use with the present invention. Third, a vertical scent array is created in the system for the elements corresponding to the object in a vertical scent array-creating step 204. Preferably, these steps are repeated periodically for the creation of vertical scent array elements for segmented objects. The vertical scent array updating steps may be performed on a different timeframe, or schedule, than the steps for vertical scent array creation. First, a vertical scent array updating step 206 is performed, in which scent scores in a particular portion of the vertical scent array are associated for each user whose field-of-view cone crosses a particular portion of the object represented by a particular portion of the vertical scent array. Second, and optionally, a vertical object-diffusing step 208 may be performed, similar in action to that described relative to diffusing step 106 of FIG. 1. In this particular embodiment, the scent score correlation of the vertical scent array is preferably performed along with the correlation of the remainder of the scent scores in the scent score-correlating step 108 of FIG. 1. However, if necessary, the scent score correlation of the vertical scent array may be performed independently of the correlation of the remainder of the scent scores. Similarly, the decay of the vertical scent scores may take place independently of the other scent scores, or it may be performed in conjunction with them in the scent score decaying step 110 of FIG. 1. An example of the equipment used in an embodiment of the present invention includes a device such as a head-worn tracking system to process and provide the user position and gaze orientation information to a central location. Additionally, a portable computing system may be provided for each user, which is capable of analyzing, filtering, and preprocessing data, determining user interests, and linking up collaborators. For example, a head-worn tracking system worn by a particular user could include a visor which actively displays a map of the area indicating areas of interest to members of a user's group or indicating other users viewing the area presently being viewed by the user. The exact configuration of the system may be tailored to the needs of a specific embodiment, and may be centralized or distributed, or a hybrid combination of these. Furthermore, although the steps of the invention are mentioned in a specific order herein, it is only for convenience's sake. In actuality, the steps of the invention may be performed in any order suitable for the needs of a particular application.

Figure 3:
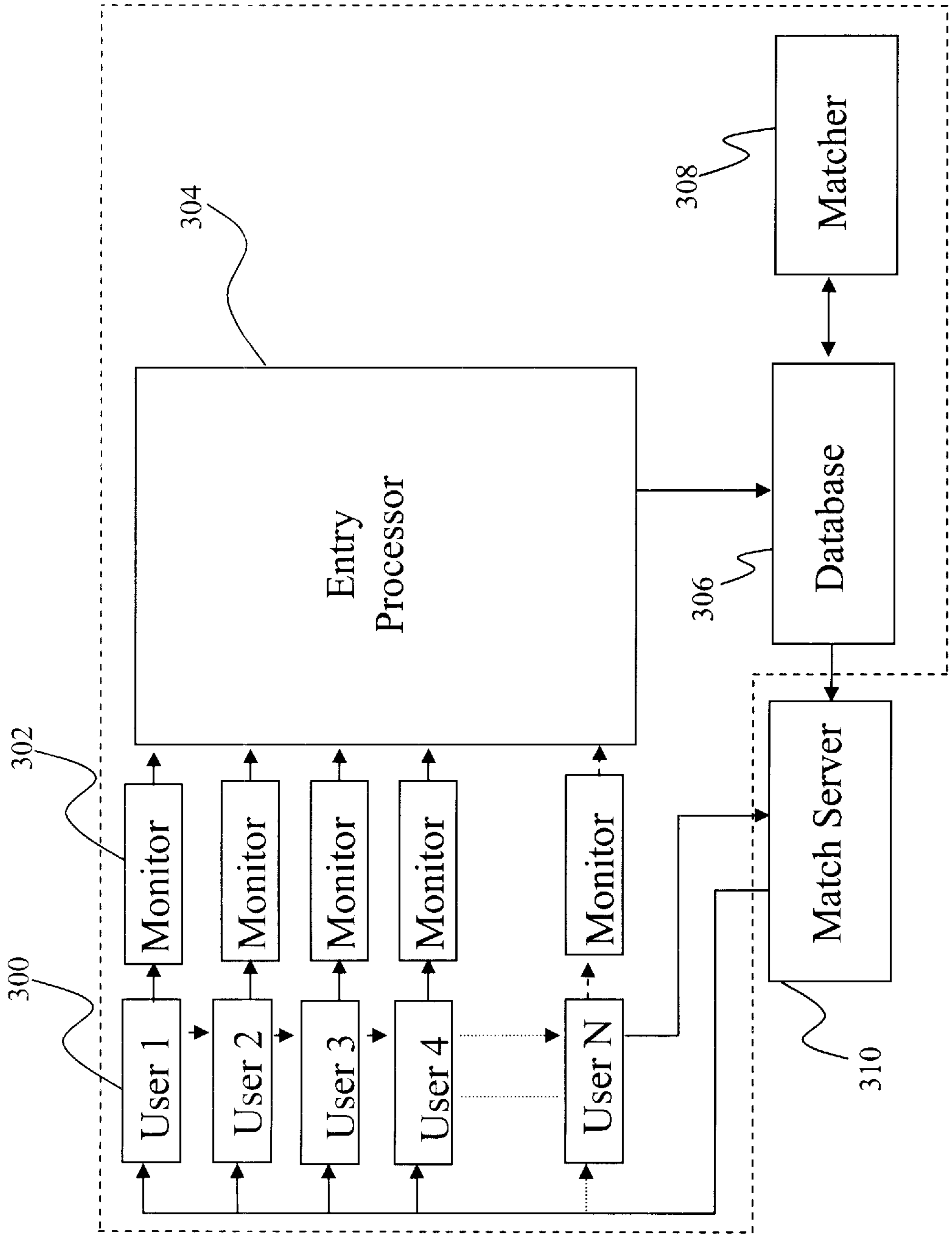
FIG. 3 provides an overview of an embodiment of the present invention demonstrating the relationship between the major components and the users.

An overview of the major components of a general embodiment of the present invention is shown in FIG. 3 in conjunction with a plurality of users 300. This overview will be followed by a more detailed discussion of field-of-view cone generation, scent score generation and decay, and scent match score generation. Then, several example specific embodiments will be presented for further clarity. The general embodiment of the present invention includes an activity monitor 302 for each of a plurality of users 300, an entry processor 304, a match database 306, and a matcher 308. A match server 310, optionally provides a system through which each of a plurality of users 300 may interface with the match database 306 in order to determine other users 300 with interests similar to theirs. The interface between the users 300 and the match database 306 may take such forms as a display on a handheld monitor or a display on an electronic visor on a head-mounted monitor. The activity monitors 302 are primarily used to gather information regarding the position and gaze direction of each of the plurality of users 300 as they move about in a physical environment. The activity monitors 302 typically take the form of a pointing device or a helmet-mounted gaze tracking system. The activity monitors 302 provide information regarding the users' position and gaze direction, typically in the form of a direction vector, to the entry processor 304. The entry processor 304 then uses an angle $\alpha$ to generate a cone centered on the direction vector to represent a field of vision representative of the likely direction of the user's gaze. The entry processor 304 creates scent score entries in the match database 306 corresponding the relevant portions of the scent score repository, which, in turn, correspond to physical locations that have been viewed. The scent scores are generated based on the length of time and number of times a particular user has viewed a physical location corresponding to a particular portion of the scent score repository. It is important to note that the activities of the users 300 may be filtered such that a certain amount of time must be spent looking in a particular direction or at a particular object for a scent score to be recorded. This helps to eliminate problems associated with scent scores created by people simply surveying an area, rather than demonstrating a specific interest. Furthermore, the relative positions of team members or the angle of a viewer's gaze may be accounted for such that, for example, in the case of a team marching along a trail, a strong scent score correlation is not developed for team members who are simply staring at the ground in front of them or at the back of the team member in front of them. The strength of the scent score allocated via the field-of-view cone for a particular portion of the scent score repository is based on the angle $\alpha$ between the direction vector and the particular portion of the scent score repository as viewed from the position of the user 300. This accounts for the idea that the more directly an area or object is viewed, the greater its likely relevance to the user 300. Essentially, the entry processor 304 receives the direction vector from the activity monitor 302, and generates a field of view cone based on the angle $\alpha$. The entry processor 304 then generates scent scores for all of the portions of the scent score repository covered by the field of view cone. The strength of the scent scores may depend on their position within the cone relative to the direction vector, their distance from the position of the user 300, the length of time in which a particular portion of the scent score repository is within the field of view cone of a the user 300, and the number of times in which a particular portion of the scent score repository is within the field of view cone of the user.

The matcher 308 interacts with the match database 306, and its activities may be generally summarized as follows: it receives scent scores for each of the users 300 and correlates them to generate scent match scores for each pair of users in order to determine groups of users with common interests (the scent score, decay, scent score diffusion, and scent match score generation will be discussed in detail further below). As previously stated, the match server 310 provides a means of interface for the plurality of users 300 that enables them to communicate and to determine both other users 300 with similar interests, and landmarks in which a plurality of users 300 similar to themselves have taken an interest. The exact interface provided by the match server 310 may vary from application to application and may take various forms depending on the presentation method most useful for a particular application. For example, in a military field operation in which individual users need to know landmarks or areas of interest, an electronic visor may be served with various forms of information to enable the users to know what other participants have identified. This information could be provided by the match server 310 in any form, ranging from a list of those looking at the same landmark or object as the user to a visual heading indicator to guide the user to a landmark or object of common interest among others of the group. On the other hand, in the case of an analysis of a department store's displays, the users may not need any information regarding other users, but the information may be provided to a third party in the form of either real-time or historical information regarding the most popular displays. It is important to note that in addition to the passive acquisition of data, the system may also provide a means by which users 300 may explicitly indicate when they are looking at something of interest. In this way, a user 300 could potentially "tag" a landmark, or at least a particular direction vector to help provide other users with notice regarding a useful direction vector. Range finders could also be used in conjunction with explicit directional information to enhance the ability of a user 300 to indicate the location of objects of interest to them. It is important to note also that maps may be used in conjunction with the scent score repository to indicate the boundaries of actual physical objects.

Next, a more detailed discussion of scent score generation and decay, linkage generation, scent score diffusion, and scent match score generation is presented.

(1) Field of View Cone Generation

The information provided by the monitor includes information regarding a user's position and gaze direction, and may optionally include elevation information. Typically, this information is in the form of a direction vector. In order to approximate the field of view of a person, portions of the scent score repository on either side of the direction vector are associated with the direction vector by means of a field-of-view angle $\alpha$. Those portions closely aligned with the direction vector may be assigned higher scent values than those further out along the field-of-view angle $\alpha$, as they are more closely aligned with the likely direction of interest, e.g. the line of sight of an individual using a head-mounted version. The exact method by which array elements further out along the field-of-view angle $\alpha$ are assigned scent values may be determined based on the needs of a particular system, as may the value of the field-of-view angle $\alpha$. The field-of-view angle $\alpha$ may be applied in both two and three-dimensional embodiments. Alternatively, in a three-dimensional embodiment, an alternative azimuth angle $\beta$ may be utilized for the vertical angle.

As discussed previously, the present invention may be designed to operate with the scent score repository represented as a set of pre-defined objects or as a two or three-dimensional array. Furthermore, it may be designed to operate with a two/three-dimensional hybrid array that is primarily a two-dimensional array, but that allows for the creation of a vertical portion in certain elements that meet particular criteria. With regard to a hybrid array, as mentioned before, the entry processor 304 may identify array elements with scent scores exceeding a particular threshold. If the entry processor 304 finds a number of adjoining array elements with scent scores exceeding the particular threshold, then it may group the array elements as one object and create a vertical array for that object. The features of this embodiment will be discussed in greater detail further below.

(2) Scent Score Generation and Decay

A simple model of the relevance of the array elements through which a user's 300 field of view cone has passed is established by associating two unique scalar values to each object or array element viewed by each user 300. These scalar values are referred to as a user's 300 "scent score" for a particular object or array element because they are intended to emulate trails left behind as the user 300 travels through a physical realm. One can envision an analogy for the scent score generation and decay for a user's 300 field of view cone as similar to shining a flashlight, where the places the flashlight has shown continue to glow, but fade with the passage of time. As a user 300 moves about, looking around, entries are created at a desired update rate. When a given entry is processed, a database entry is made which associates each object or array element via the user's 300 field-of-view cone with the user's 300 two scalar values, the first scent score, termed a long-term scent score (SL) and the second scent score, termed a short-term scent score (SS).

If an entry already exists for the given array element and user pair, then the two scent scores are updated as follows:

$$SL=SL+(1-SL)*KL;\text{ and}$$

$$SS=SS+(1-SS)*KS,$$

where KS and KL are chosen as either constants or may be equations such that KS>KL.

This inequity causes the value of SS to rise faster than the value of SL. Other update schemes are also possible so long as the scent score scalars for a user 300 at a given array element increase to some degree with each update cycle in which the user's view cone covers a given array element and are subject to a certain maximum limit to the total amount of the increase over time to prevent saturation.

If an entry does not already exist for the given array element and user pair, then new scent score entries are created, and initial values of SL and SS are established as follows, with CL and CS representing constant initial values for SL and SS:

$$SL=CL; \text{ and}$$

$$SS=CS.$$

Note that these values, KL, KS, CL, and CS, may also be tailored based on the position of the array element or object within the user's 300 field-of-view cone. While the scent score associated with a user at a particular array element increases with each cycle in which it is viewed, it also decreases over time. This decrease, or decay, prevents all array elements from ultimately moving to the maximum scent score intensity level. It also allows the scent score information to better reflect recent user interests. Just as the long-term scent score increases more slowly than the short-term scent score, long-term scent score also decays more slowly than short-term scent score. The periodic update is established as follows:

$$SL=SL*DL; \text{ and}$$

$$SS=SS*DS,$$

where DS and DL are chosen as either constants or equations such that DS<DL. This inequity causes the SL values to decay more slowly than the SS values. Therefore, the decay function can be performed over time during each update cycle, or periodically with a set number of update cycles in-between. It is important to note that various decay schemes may be used depending on the requirements of a specific application.

(3) Scent Match Score Generation

With each user having both long-term and short-term scent scores associated with various array elements, the next step is to compute scent match scores for each pair of users. Scent match scores can be obtained by comparing the short-term scent scores of two users, the long-term scent scores of two users, or the short-term scent scores of one user against the long-term scent scores of another. The scent match scores, in the case of a two-dimensional scent array, are obtained through the equations below:

$$\text{SS\_Match}_{ab} = \frac{\sum_p \frac{SS_{apx}SS_{bp}}{Stot_p}}{\sqrt{\sum_p SS_{ap}^2} \times \sqrt{\sum_p SS_{bp}^2}},$$

$$\text{LL\_Match}_{ab} = \frac{\sum_p \frac{SL_{apx}SL_{bp}}{Stot_p}}{\sqrt{\sum_p SL_{ap}^2} \times \sqrt{\sum_p SL_{bp}^2}}, \text{ and}$$

-continued $$\text{SL\_Match}_{ab} = \frac{\sum_p \frac{SS_{apx}SL_{bp}}{Stot_p}}{\sqrt{\sum_p SS_{ap}^2} \times \sqrt{\sum_p SL_{bp}^2}};$$

where:

- $\text{SS\_Match}_{ab}$ is the match between the short-term scent scores of users a and b;
- $\text{SL\_Match}_{ab}$ is the match between the short-term scent score of user a and the long-term SS scent score of user b;
- $\text{LL\_Match}_{ab}$ is the match between the long-term scent scores of users a and b; $Stot_p$ is the total number of distinct user scent scores that can be found in the particular portion of the scent score repository p;
- $SS_{ap}$ is the short-term scent score scalar assigned to user a in the particular portion of the scent score repository p;
- $SL_{ap}$ is the long-term scent score scalar assigned to user a in the particular portion of the scent score repository p;
- $SS_{bp}$ is the short-term scent score scalar assigned to user b in the particular portion of the scent score repository p; and
- $SL_{bp}$ is the long-term scent score scalar assigned to user b in the particular portion of the scent score repository p.

In specific cases involving a hybrid two/three dimensional array or a three-dimensional array, the equations may be adjusted as follows to incorporate the elements of the vertical array elements:

$$\text{SS\_Match}_{ab_{hybrid}} = \frac{\phi \sum_p \backslash(\backslash\%\ \backslash) \frac{SS_{ap} \times SS_{bp}}{Stot_p}}{\sqrt{\sum_p \backslash(\backslash\%\ \backslash) SS_{ap}^2} \times \sqrt{\sum_p \backslash(\backslash\%\ \backslash) SS_{bp}^2}} + \frac{(1-\phi) \sum_v \backslash(\backslash\%\ \backslash) \frac{SS_{av} \times SS_{bv}}{Stot_p}}{\sqrt{\sum_p \backslash(\backslash\%\ \backslash) SS_{av}^2} \times \sqrt{\sum_p \backslash(\backslash\%\ \backslash) SS_{bv}^2}},$$

$$\text{LL\_Match}_{ab_{hybrid}} = \frac{\phi \sum_p \backslash(\backslash\%\ \backslash) \frac{SL_{ap} \times SL_{bp}}{Stot_p}}{\sqrt{\sum_p \backslash(\backslash\%\ \backslash) SL_{ap}^2} \times \sqrt{\sum_p \backslash(\backslash\%\ \backslash) SL_{bp}^2}} + \frac{(1-\phi) \sum_v \backslash(\backslash\%\ \backslash) \frac{SL_{av} \times SL_{bv}}{Stot_p}}{\sqrt{\sum_p \backslash(\backslash\%\ \backslash) SL_{av}^2} \times \sqrt{\sum_p \backslash(\backslash\%\ \backslash) SL_{bv}^2}}, \text{ and}$$

$$\text{SL\_Match}_{ab_{hybrid}} = \frac{\phi \sum_p \backslash(\backslash\%\ \backslash) \frac{SS_{ap} \times SL_{bp}}{Stot_p}}{\sqrt{\sum_p \backslash(\backslash\%\ \backslash) SS_{ap}^2} \times \sqrt{\sum_p \backslash(\backslash\%\ \backslash) SL_{bp}^2}} +$$

-continued $$\frac{(1-\phi)\sum_{v}\underline{\backslash(\backslash\%\ \backslash)}\frac{SS_{av}\times SL_{bv}}{Stot_p}}{\sqrt{\sum_{p}\underline{\backslash(\backslash\%\ \backslash)}SS_{av}^2}\times\sqrt{\sum_{p}\underline{\backslash(\backslash\%\ \backslash)}SL_{bv}^2}};$$

$SS\_Matchab_{hybrid}$ is the match between the short-term scent scores of users a and b;

$LL\_Matchab_{hybrid}$ is the match between the long-term scent scores of users a and b;

$SL\_Matchab_{hybrid}$ is the match between the short-term scent score of user a and the long-term scent score of user b;

Φ is an inclusion factor ranging from 0 to 1, which allows the importance of the vertical scent array elements to be allocated in the equations in a weighted manner;

$Stot_p$ and $Stot_v$ are the total number of distinct user scent scores that can be found in the particular array element p and in the particular vertical array element v, respectively;

$SS_{ap}$ and $SS_{av}$ are the short-term scent score scalars assigned to user a in the particular portion of the particular array element p and in the particular vertical array element v, respectively;

$SL_{ap}$ and $SL_{av}$ are the long-term scent score scalars assigned to user a in the particular portion of the particular array element p and in the particular vertical array element v, respectively;

$SS_{bp}$ and $SS_{bv}$ are the short-term scent score scalars assigned to user b in the particular portion of the particular array element p and in the particular vertical array element v, respectively; and $SL_{bp}$ and $SL_{bv}$ are the long-term scent score scalars assigned to user b in the particular portion of the particular array element p and in the particular vertical array element v, respectively.

The above calculations are comparable to treating each user's scent score pattern as a very high-dimensional vector, and finding the cosine of the angle between each vector pair. The one distinction, however, is that the division by $Stot_p$ in the numerator sum provides a discount factor for scent scores that occur in the particular portions of the scent score repository that are accessed by many users. This discounting prevents particular portions of the scent score repository that are relatively unrelated to any specific user interests from being counted in the match score. Although this method of correlation has been found useful in the context of the present invention, other correlation schemes may be used depending on the needs of the particular system.

Once user matches are computed and stored in the match database 306, information regarding user 300 matches may be used to provide users 300 with information regarding others with interests in the same landmarks or objects. This information is provided via a match server 310. The match server 310 interacts with the match database 306 to determine users 300 who may be considered collaborators, i.e. people who have scent scores allocated with the same particular portion of the scent score repository or who are currently viewing the same landmarks or objects. Those users 300 exhibiting a high degree of scent score correlation are designated as potential collaborators, with each particular user 300 being provided with information regarding a set of those having a high degree of scent score correlation with them.

Finally, a pruning operation may be performed in order to keep the match database 306 from growing to an unmanageable size. In this operation, scent score entries for portions of the scent score repository that have little value for matching are eliminated by pruning all scent score entries for portions of the scent score repository in which the user 300 scent score falls below a certain threshold value due to decay.

(4) Linkage Generation

The linkage is a measure of similarity between different objects. This measure is generated to capture the notion that a user's interest in one object should be reflected in related objects. One means by which this may be accomplished is to consider the sequence of objects visited by a user as an indicator of similarity. Thus, if a user viewing one object and then another object within a short period of time, a linkage association may be established between the two objects. This method is driven by the idea that people tend to follow a line of thought and that their interest in a particular topic will be present over a period of time during a given information gathering session. The degree of linkage established by this means may be either a constant within a fixed time threshold, or it may be made as a function of time between viewing events. This method is used to find other objects that bear some relation to an object that has been viewed by a particular user.

In the case where sequential viewing to objects is used in the generation of a linkage measure, the measure is determined using an associative reinforcement algorithm. Each time two objects, A and B, are viewed in proximity to one another, the linkage measure $L_{AB}$ is updated, where $L'_{AB}$ is the updated linkage measure, as follows:

$$L'_{AB}=L_{AB}+(1-L_{AB})*k(t)$$

where $k(t)<1$.

The value of k(t) is the incremental update factor for associating object A to object B where t represents the time that has elapsed between a user viewing object A and then object B. In general, the value of k(t) decreases as the value of t increases from zero. Also, for each forward association created from object A to object B, a reverse association from object B to A may be created as follows, where $L'_{BA}$ is the updated association value:

$$L'_{BA}=L_{BA}+(1-L_{BA})*\alpha k(t)$$

where $k(t)<1$ and$\alpha<1$

In general, though optionally, this reverse association will be made weaker than the forward association by use of α value of a that is less than one. A result is that the similarity measure between any two objects will not necessarily be symmetric.

When other methods for determining similarity between objects are used, they are combined with the similarity measure obtained from sequential viewing. In this case, a similar form of reinforcement update is used, except that the update factor k(t) is replaced with a value $\beta*S$ where S is the similarity measure calculated by whatever means chosen, and β is a constant used to indicate the significance of the source of the measure. For example, β will be larger for similarities obtained from explicit user groupings than for similarities obtained from reference overlay map information. There are many different means for generating a similarity measure between objects, including explicit user groupings and similarities obtained from reference overlay map information as mentioned before. It is also possible that users may be able to explicitly set the level of similarity through the use of a rating system or other similar means.

(5) Scent Score Diffusion

Scent scores are dispersed from objects a user has visited to other similar objects through diffusion and decay processes. The diffusion process uses the object similarity measures as a means to determine which objects are similar. Given a user's scent score with intensity $SS_A$ and $SL_A$ at object A, and intensity $SS_B$ and $SL_B$ at object B, then the proximity from object A to object B, $P_{AB}$ is used to update the user's scent score at object B as follows, where the prime symbol "'" indicates the updated value:

$$\text{if } SS_A>SS_B\text{: } SS'_B=SS_B+(SS_A-SS_B)*L_{AB}*r$$

$$\text{if } SL_A>SL_B\text{: } SL'_B=SL_B+(SL_A-SL_B)*L_{AB}*r$$

Where the term r is used to determine the general rate of diffusion. In some cases, it may be desirable to make the value of r different for short-term and long-term scent score intensity values. For example, making the value of r larger for short-term scent scores than for long-term scent scores would allow the short-term scent score values to propagate faster than the long-term scent score values. In all cases, r must be less than or equal to 1.

An important condition that must be satisfied before propagating any scent score values from object A to object B is the number of objects that have been identified as similar to object A and the number of unique user scent scores that already exist at object A. If the product of these two quantities is greater than a chosen threshold value, then no scent score will be propagated from object A. This is done to create a model wherein some objects act as a sink for scent scores. Scent score sinks are generally objects which are very generic, such as a particular part of a museum such as a drinking fountain or the information booth, which many users have visited and from which little useful interest-related information may be derived.

Figure 4:
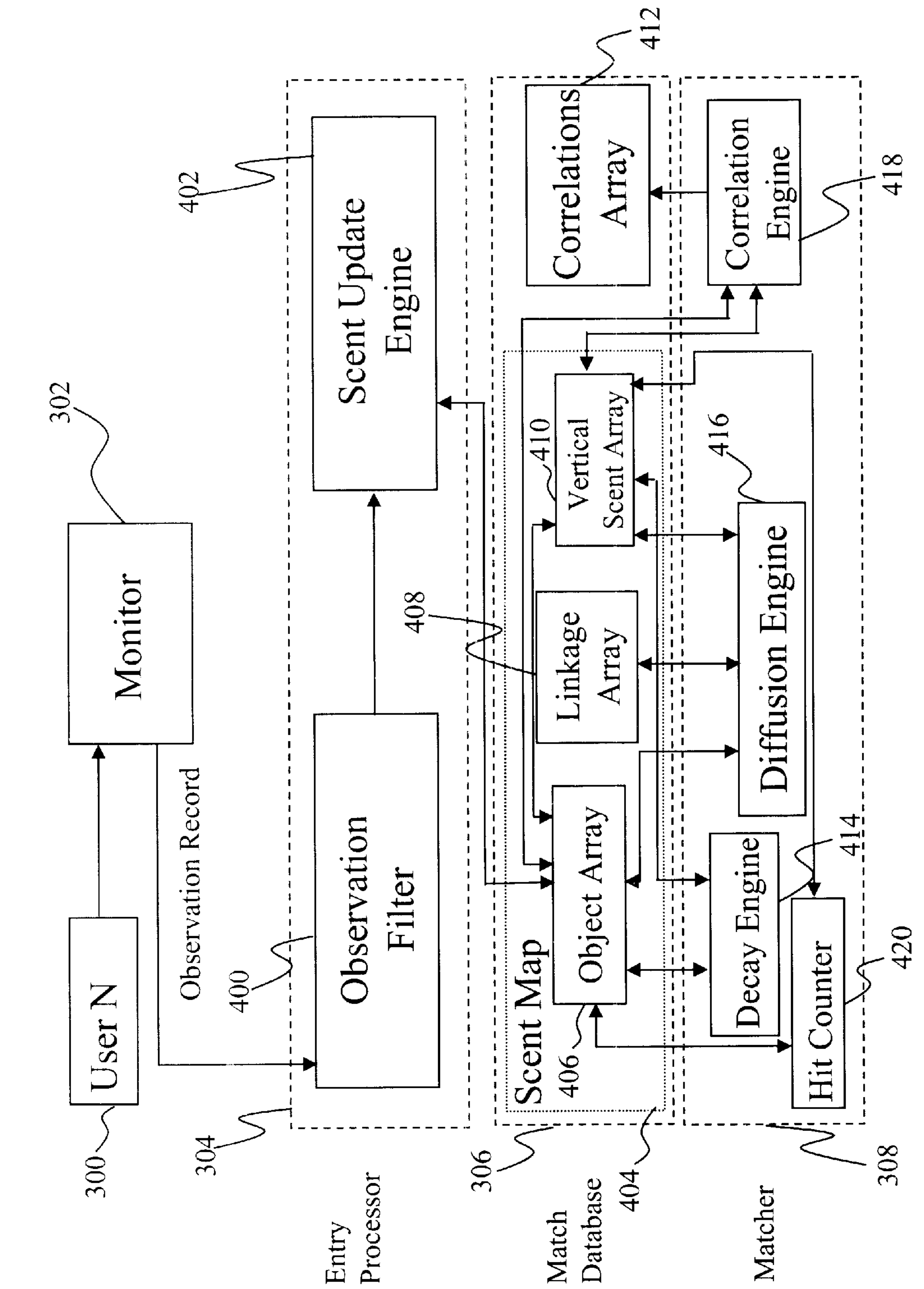
FIG. 4 provides a system detail of a first specific embodiment of the present invention demonstrating the components of the entry processor, the match database, and the matcher wherein the scent score repository includes a scent map having an object array and a vertical scent array.
Figure 9:
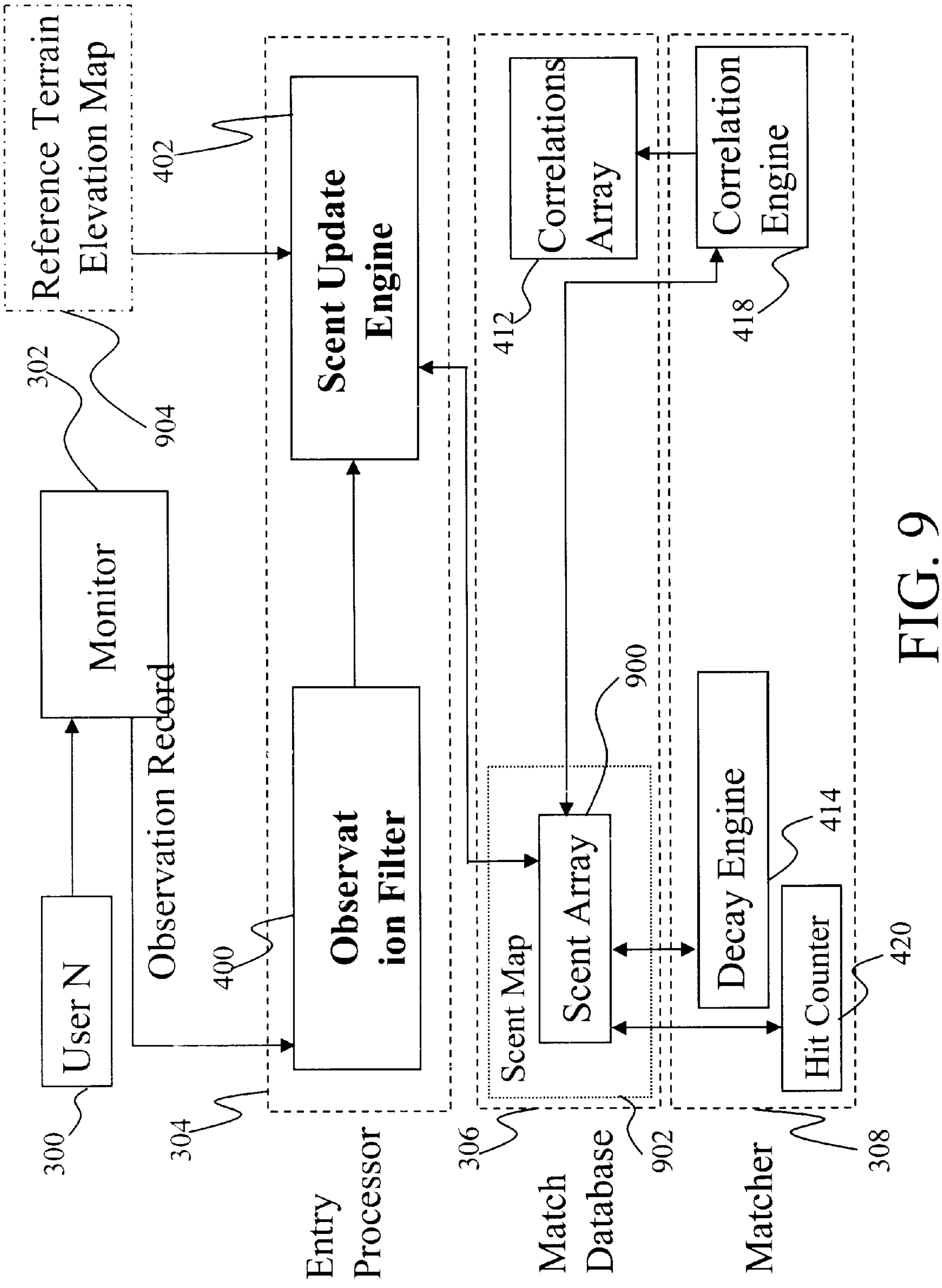
FIG. 9 provides a system detail of a second specific embodiment of the present invention demonstrating the components of the entry processor, the match database, and the matcher wherein the scent score repository includes a scent map having a two-dimensional scent array.
Figure 13:
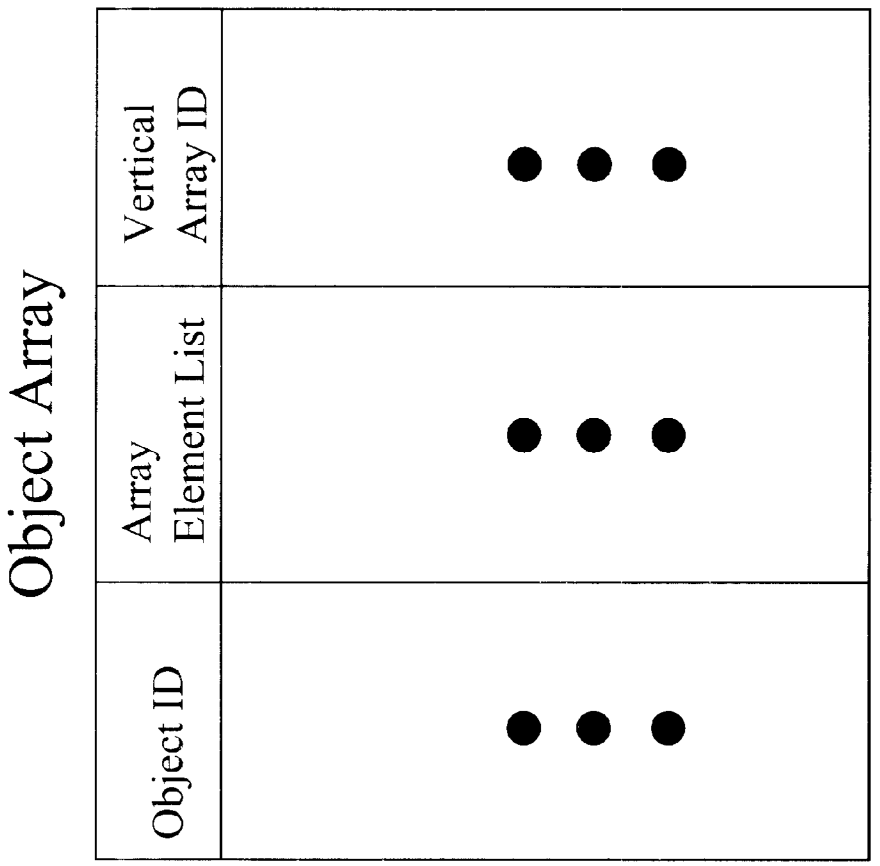
FIG. 13 provides an example of an object array adapted for use with the third specific embodiment of the present invention shown in FIG. 12.

Three specific embodiments of the present invention are described below. In particular, FIG. 4 provides a system detail of an embodiment wherein the scent score repository takes the form of an object array 406, a linkage array 408, and a vertical scent array 410, and including a diffusion engine 416. FIG. 9 provides a system detail of embodiment of the present invention wherein the scent score repository is a two-dimensional scent array 900. FIG. 13 provides a system detail of the preferred embodiment of the present invention contemplated by the inventors, wherein the scent score repository is a two/three-dimensional hybrid scent array including a two-dimensional scent array and a vertical scent array. It is important to note that these embodiments are presented in order to provide non-limiting and specific examples of possible feature combinations, which may be incorporated into the invention. It is contemplated that many variations in these features as well as in the combination of features used for a particular embodiment will be readily apparent to those skilled in the art. Therefore, the specific embodiments presented are not to be construed as limitations to the scope of the present invention.

(6) Specific Embodiment One

Scent Score Repository as a Scent Map Including an Object Array.

As previously stated, FIG. 4 provides a system detail of an embodiment wherein the scent score repository takes the form of an object array 406, a linkage array 408, and a vertical scent array 410, and including a diffusion engine 416. Pursuant to this specific embodiment FIG. 4 provides more detail regarding the entry processor 304, the match database 306, and the matcher 308. As shown, the entry processor 304 includes an observation filter 400 and a scent update engine 402; the match database 306 includes a scent map 404 and a correlations array 412, with the scent map 404 including an object array 406, a linkage array 408, and a vertical scent array 410; and the matcher 308 includes a decay engine 414, a diffusion engine 416, a correlation engine 418, and a hit counter 420. In operation, the observation filter 400 of the entry processor 304 receives incoming information from a user 300 via the monitor 302 regarding their gaze direction, typically in the form of direction vectors. The observation filter 400 then examines the information and applies a filtering mechanism based on a particular criterion chosen to eliminate unwanted information from the system. For example, it may filter by eliminating information pertaining to users 300 who happen to be looking at the ground or in directions that are unlikely to be useful for the discovery of potential collaborators. It may also require certain criteria to be met before it accepts information, such criteria, as a non-limiting example, may include the requirement that a user 300 look in a direction for at least a certain minimum amount of time before the observation filter accepts the information as an indication of interest. Note that the function of the observation filter 400 may also be incorporated into the monitor 302 so that non-useful observations may be filtered out before transmission into the entry processor 304 in order to minimize the data transmission requirements.

When the observation filter 400 accepts an observation record from the monitor 302, it passes the observation record to the scent update engine 402, which interacts with the object array 406 of the scent map 404 to determine whether the user 300 was looking in the direction of an object from the object array 406. This determination is made through the use of specific information regarding the object's location, and on the direction vector and the field-of-view angle $\alpha$ from the user 300. The object array 406 may, optionally, be pre-programmed or re-configurably programmed through the use of an object map. This allows for changes in the object array 406 for a particular geographical region, or for updating the object array 406 over time. The addition of the scents into the object array 406 may be likened to adding marbles into a set of bins, with each of the bins being associated with a particular object in the object array 406. The scent values in the object array 406 are accumulated based on a combination of the position of the object with respect to the user's 300 scent cone, the number of times the user 300 has viewed the object, and the amount of time the user 300 has spent viewing the object.

As shown in the embodiment of FIG. 4, a vertical scent array 410 is incorporated, corresponding to the vertical portion of the objects viewed. Thus, for each object, a vertical aspect is generated, which may be used to keep track of the vertical component of a user's 300 gaze with respect to the object viewed. The scent cone azimuth angle $\beta$, as previously discussed relative to scent cone generation, is used in the application of scents to the elements of the vertical scent array 410 which correspond to the vertical portion of the object viewed by the user 300. Note that the elements of the vertical scent array 410 may either be pre-defined along with corresponding objects in the object array 406, or they may be generated on the fly as users view vertical portions of each object.

The linkage array 408 of the scent map 404 of the match database 306 and the diffusion engine 416 of the matcher are used in order to diffuse the scent scores for a particular object to other, related, objects via particular linkages, which are stored in the linkage array 408. The term "linkage" is herein defined as a connection between two or more objects or portions of objects, the strength of which guides the diffusion of scent scores from the object actually viewed to related objects. For example, in a museum strong linkages may be generated between paintings by a particular artist so that a user's 300 scent scores are strongly diffused to other paintings by the particular artist because of their relatedness. Weaker linkages may be generated for other paintings in the museum, since they are also related in the sense that they are paintings. On the other hand, no linkage would be generated between paintings and fossils, since paintings and fossils are unrelated. These linkages may be pre-set, or may be generated on the fly by monitoring the user's 300 viewing patterns and drawing inferences therefrom. The diffusion engine 416 interacts with the object array 406, the linkage array 408, and the vertical scent array 410 in order to store scents based on diffusion via the values of the linkages stored in the linkage array 408.

The decay engine 414 of the matcher 308 operates on the object array 406 and the vertical scent array 410 of the scent map 404 of the match database 306. The purpose of the decay engine 414 is to reduce the short-term scent score and the long-term scent score assigned to each object. The particular reduction method or degree may vary for the particular scent reduced, i.e. may be different for the decay of the short-term scent score than it is for the decay of the long-term scent score. If a short-term scent score or long-term scent score for a particular user 300 corresponding to a particular object of the object array 406 or a particular vertical element of the vertical scent array 410 falls below a certain threshold, the scent score entry for the particular object or vertical element may be eliminated entirely. Furthermore, in the case where linkages are generated, they also decay over time and will be eliminated if they become sufficiently small. In operation, the decay engine 414 serves to ensure that the scent scores associated with objects do not accumulate indefinitely, and that they are sufficiently recent to be useful. Furthermore, the decay engine 414 performs cleanup function in order to eliminate unnecessary scent entries in order to streamline the database size.

The hit counter 420 of the matcher 308 provides a counting mechanism for each object of the object array 406 and the vertical scent array 410. It searches the object array 406 and the vertical scent array 410 to determine the number of users 300 who have viewed a physical area corresponding to a particular object of the object array 406 or a particular element of the vertical scent array 410. The hit counter 420 may provide a summary statistic in the object array 406 and the vertical scent array 410 in order to keep track of the total number of users 300 who have visited the particular object or element. The hit counter 420 also examines the object array 406 and the vertical scent array 410 to determine the total number of scent scores for each object of the object array 406 and each element of the vertical scent array 410, and provides these totals in the object array 406 and the vertical scent array 410.

The correlation engine 418 of the matcher 308 correlates the scent scores from the object array 406 and the vertical scent array 410 for pairs of users 300, and then determines and updates the short-term match scores, the long-term match scores, and the long-term to short-term match scores for each pair of users 300. This information is provided to a correlations array 412, which stores information regarding users 300 sharing common interests in particular objects of the object array 406 and elements of the vertical scent array 410. Next, greater details with regard to the object array 406, the linkage array 408 the vertical scent array 410, the correlations array 412, are provided in FIGS. 5, 6, 7, and 8, respectively, in accordance with the specific embodiment of the present invention set forth in FIG. 4.

Figure 5:
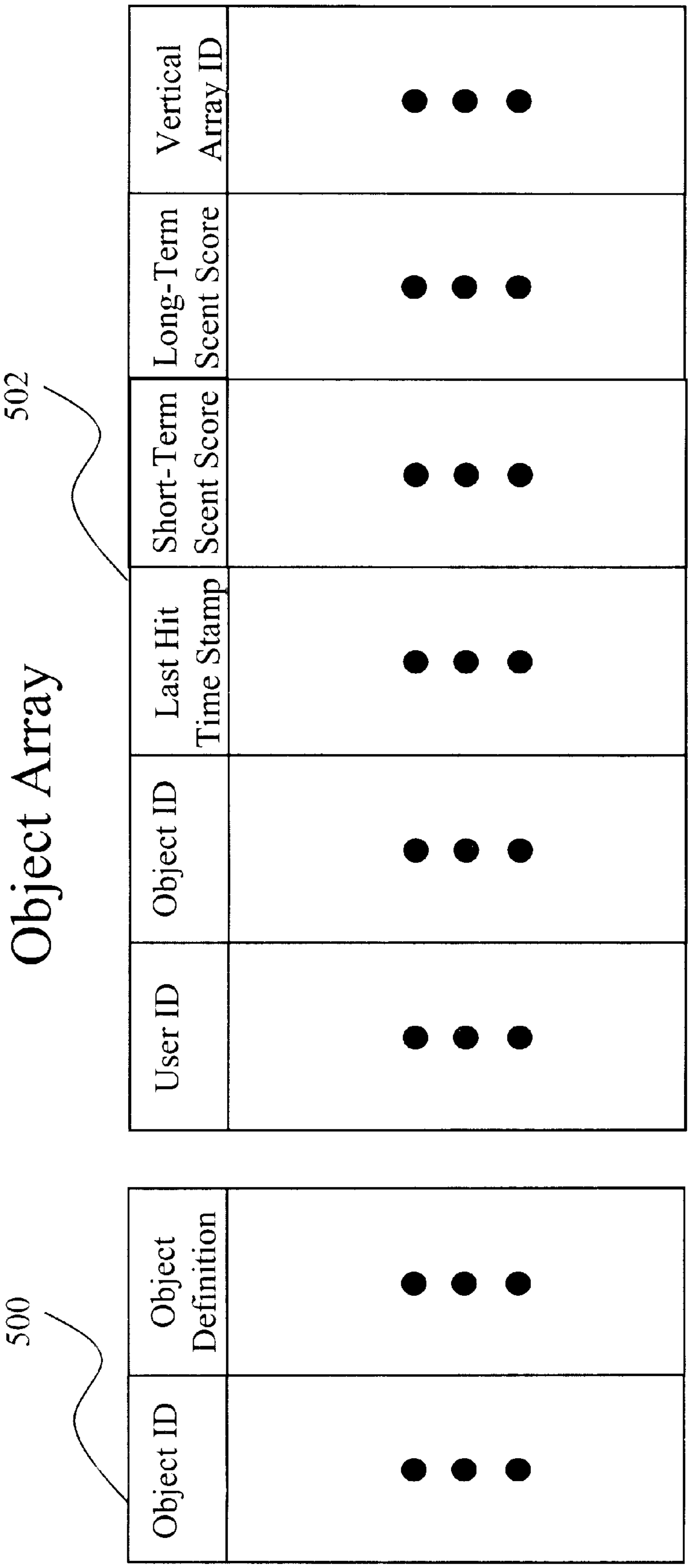
FIG. 5 provides an example object array component of the scent map of the match database of the first specific embodiment of the present invention shown in FIG. 4.

As shown in FIG. 5, each entry of the object array 406 includes an object identification and definition array portion 500, and an object scent score array portion 502. The object identification and definition array portion 500 includes a unique object identification as well as object definition information for each object in the system. The object definition information provides a description of the objects, in terms of the array elements or the perimeter defining the area of the object. The object scent score array portion 502 includes entries for user identifications, object identifications, last hit time stamps, short-term scent scores, long-term scent scores, and vertical array identifiers for each user 300 in relation to each object viewed.

Figure 6:
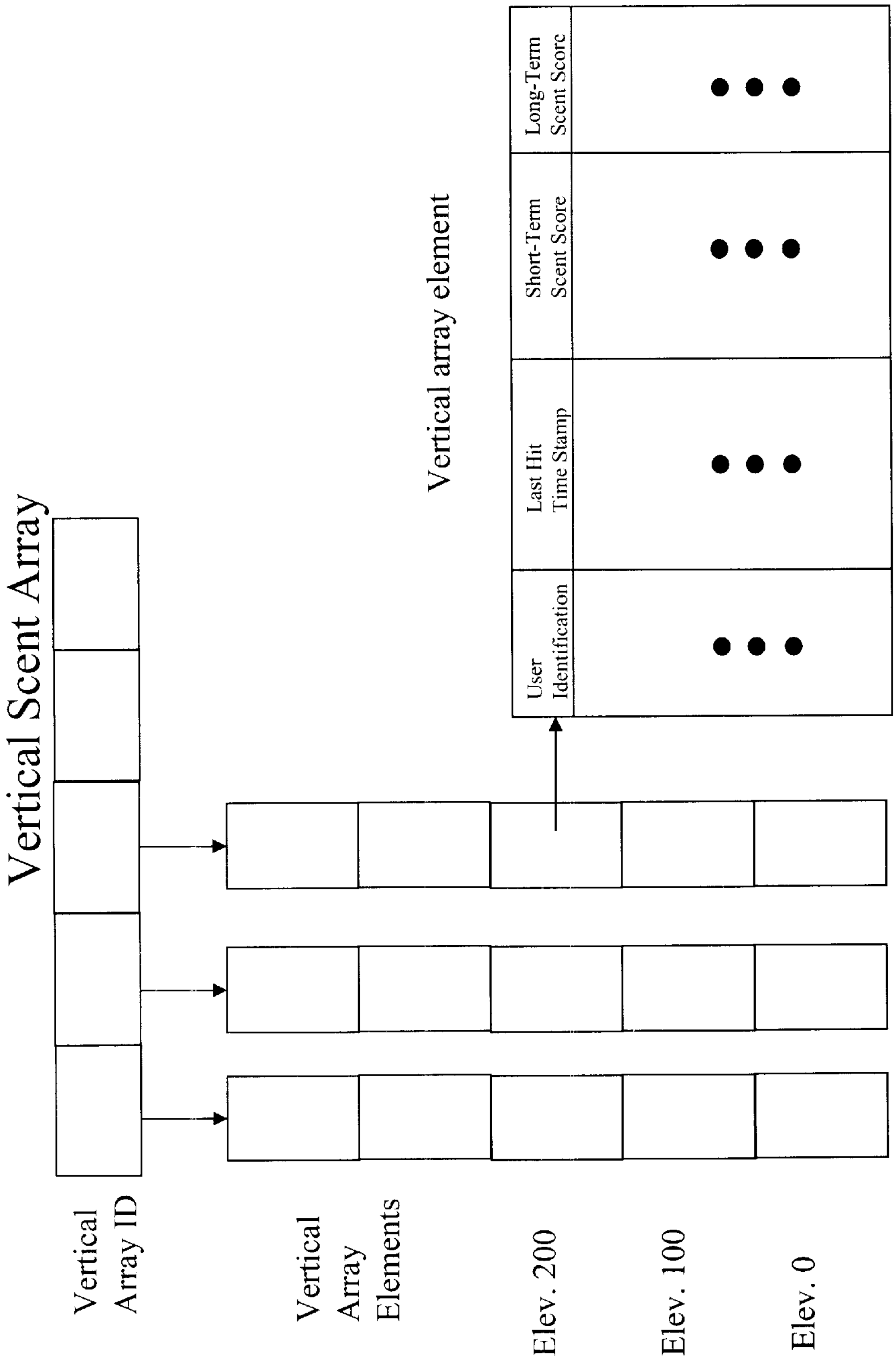
FIG. 6 provides an example vertical scent array component of the scent map of the match database of the first specific embodiment of the present invention shown in FIG. 4.

As presented in FIG. 6, each entry in the vertical scent array 410 includes a vertical array identifier, and vertical array elements, corresponding to each vertical array identifier. In the embodiment of FIG. 4, the vertical array identifier corresponds to a particular object or portion of an object for which elevation information is tracked. As shown, the elements of the vertical scent array 410 include user identification information, the last hit time stamp, the short-term scent score, and the long-term scent score associated with the particular element of the elevation array. Note that the elements of the vertical scent array 410 may be assigned a pre-set height intervals, or the intervals may be determined as a function of the height and the nature of each individual object and the user's 300 vertical viewing pattern. For example, if the user 300 looked over a one hundred vertical foot portion of an object quickly, the intervals may be set at one hundred feet. However, if the user 300 more slowly looked at only a five vertical foot portion of an object, the intervals may be set more finely. Other information may be included in the object array 406 and the vertical scent array 410, as necessary for a specific embodiment.

It is important to note with regard to the object array 406 and the vertical scent array 410 of FIGS. 5 and 6, respectively, that there are many different configurations possible which would yield essentially the same result. For example, the object array 406 may consist simply of an object identification, an object definition, and a scent array reference. Furthermore, the vertical scent array 410, when used without a vertical dimension, will collapse into a simple object array without a vertical component. Thus, a vertical scent array 410 could, in the most general case, be used as a scent repository and could be linked to the object array 406 by a common key.

As demonstrated in FIG. 7, each entry of the correlations array 412 includes information regarding the user identification information for two users, short-term scent score match information, long-term scent score match information, and long-term to short-term scent score match information.

As shown in FIG. 8, each entry in the linkage array of the diffusion engine/linkage array 416 for embodiment of the present invention shown in FIG. 4 includes the source object identification, the destination object identification, and the value of the linkage strength.

With regard to the system of FIG. 4 and the arrays shown in FIGS. 5, 6, 7, and 8, it is important to note that many configurations may be developed utilizing the same general components. The elements that comprise the entry processor 304, the match database 306, and the matcher 308 are somewhat arbitrarily grouped for clarity of explanation. In a particular embodiment, the grouping of elements may be much different than that presented in the drawings and described without having an appreciable effect on the system's functionality. More specifically, for example, arrays utilized in the match database 306 may be constructed such that the information collected is grouped differently among them, and they may take different forms, mainly depending on the nature of the scent score repository. The main importance lies in the system's functionality, not its specific structure, as much of the structure depends on the construction of the particular database used for its implementation. This construction will vary depending on such factors as the software used, the particular application, and the particular developer.

It is important to note that this embodiment of the present invention may also be generated as a specific case of the object array with a vertical array, in which the vertical array is reduced to an array of one vertical array element. In this case, the object array would include an object identification, an object definition, and a vertical array identification, while the vertical scent array would store the remainder of the information shown in the object array embodiment of FIG. 5.

(7) Specific Embodiment Two

Scent Score Repository as a Scent Map Including a Two-Dimensional Scent Array.

As mentioned previously, FIG. 9 provides a system detail of embodiment of the present invention wherein the scent score repository is a two-dimensional scent array 900. The major functions of the users 300, the monitor 302, the entry processor 304, the match database 306, and the matcher 308 are as were discussed relative to FIG. 3 and FIG. 4. The main difference between the embodiment of FIG. 4 and FIG. 9 lies in the scent score repository, wherein a two-dimensional scent array 900 is used, rather than an object array 406, as shown in FIG. 4. Additionally, the embodiment of FIG. 9 does not include a vertical scent array 410, as shown in FIG. 4, though depending on the particular needs of a specific embodiment, it may be included to provide a hybrid two/three-dimensional scent array embodiment. In the embodiment of FIG. 9, when the observation filter 400 has accepted an observation record from the monitor 302, it passes the observation record to the scent update engine 402, which interacts with the two-dimensional scent array 900 of the scent map 902. The field-of-view cone of the user 300 is used in the determination of the elements of the two-dimensional scent array 900 in which to record scent scores for that particular user 300. If the particular user 300 has not viewed the particular physical region corresponding to a particular array element before, the scent update engine 402 creates new scent score entries for that user 300 for those particular array elements. If the scent scores for the user 300 are already present, then their values will be increased as discussed previously relative to scent score generation and decay.

In the embodiment shown, because there is no vertical component to the scent array 900, only the horizontal angle a need be taken into account for the field-of-view cone. An optional reference terrain elevation map 904 is also shown, which may be used in order to further define the field-of-view cones of the users 300. The information from the map may help to ensure that scent scores are not recorded for areas, which, due to terrain or other effects, could not possibly be seen by the user 300. The scent values in the two-dimensional scent array 900 are accumulated much as described for the object array 406 of FIG. 4, and are accumulated based on a combination of the position of the array element within the scent cone of the user 300, the number of times the user 300 has viewed the array element, and the amount of time the user 300 has spent viewing the array element.

The correlations array 412, the decay engine 414, the correlation engine 418, and the hit counter 420 all operate as described relative to FIG. 4, except for their interaction with the scent array 900 as shown in FIG. 9. Also, the details of the correlations array 412 are as previously described relative to FIG. 7.

Figure 10:
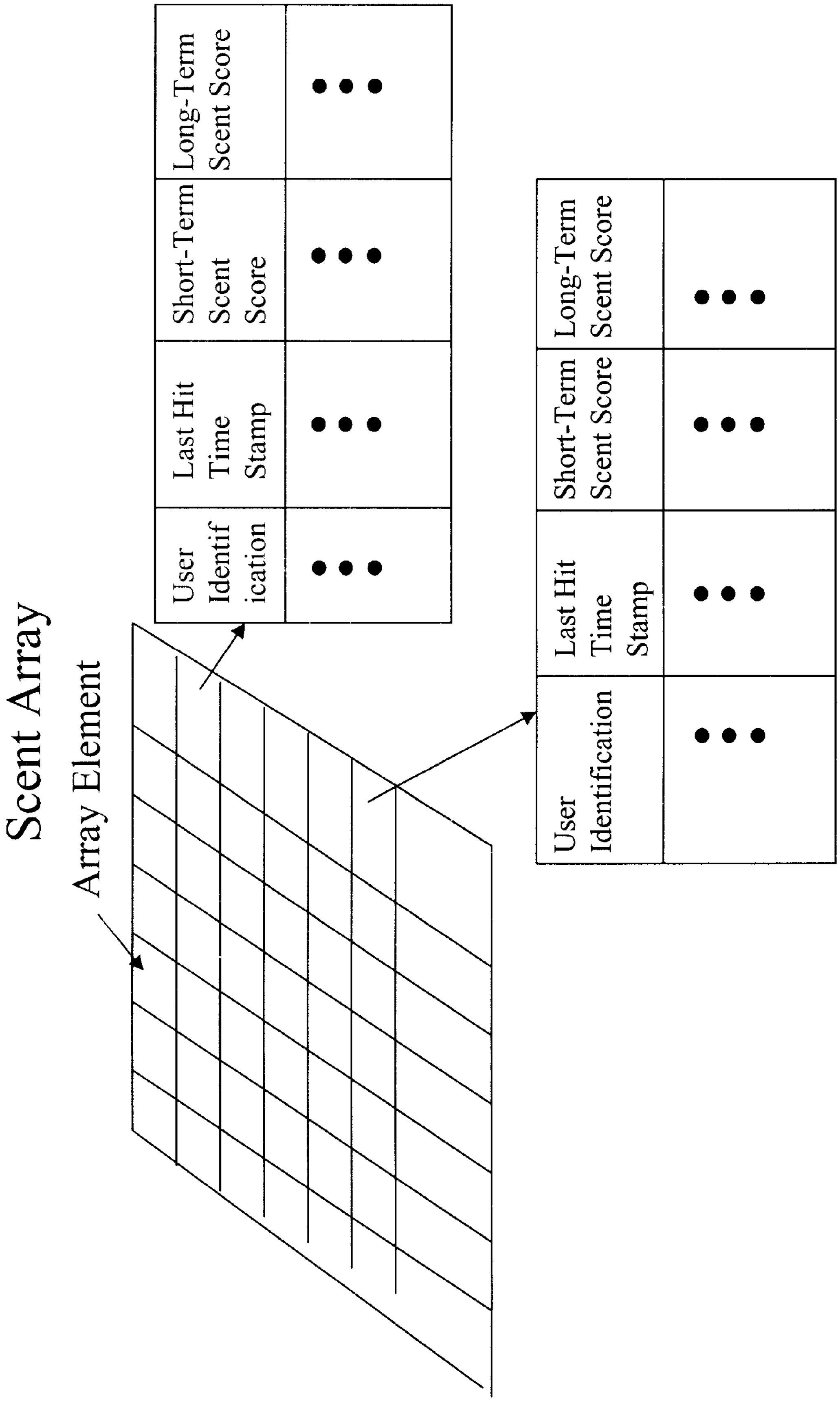
FIG. 10 provides an illustrative example of a two-dimensional scent array in accordance with the present invention.

The two-dimensional scent array 900 is shown in detail in FIG. 10, and includes a plurality of array elements. The addition of scent entries to the two-dimensional scent array 900 may be likened to adding marbles to bins in a two dimensional grid of bin-holes with the number of marbles put into each bin depending on the position of the bin within the field-of-view cone and in relation to the number of cycles during which the particular boxes are included in the user's field-of-view. Typically, the scent score entries each include scent scores, a user identification, and a time stamp of the last hit on the array element by the particular user 300, possibly along with additional information. If the particular user 300 has previously viewed the particular physical region corresponding to a particular array element, the time stamp and scent scores are updated. As discussed previously, the long-term scent score is incremented upward at a slower rate than the short-term scent score, causing the short-term scent score to be more sensitive to recent activities.

Figure 11:
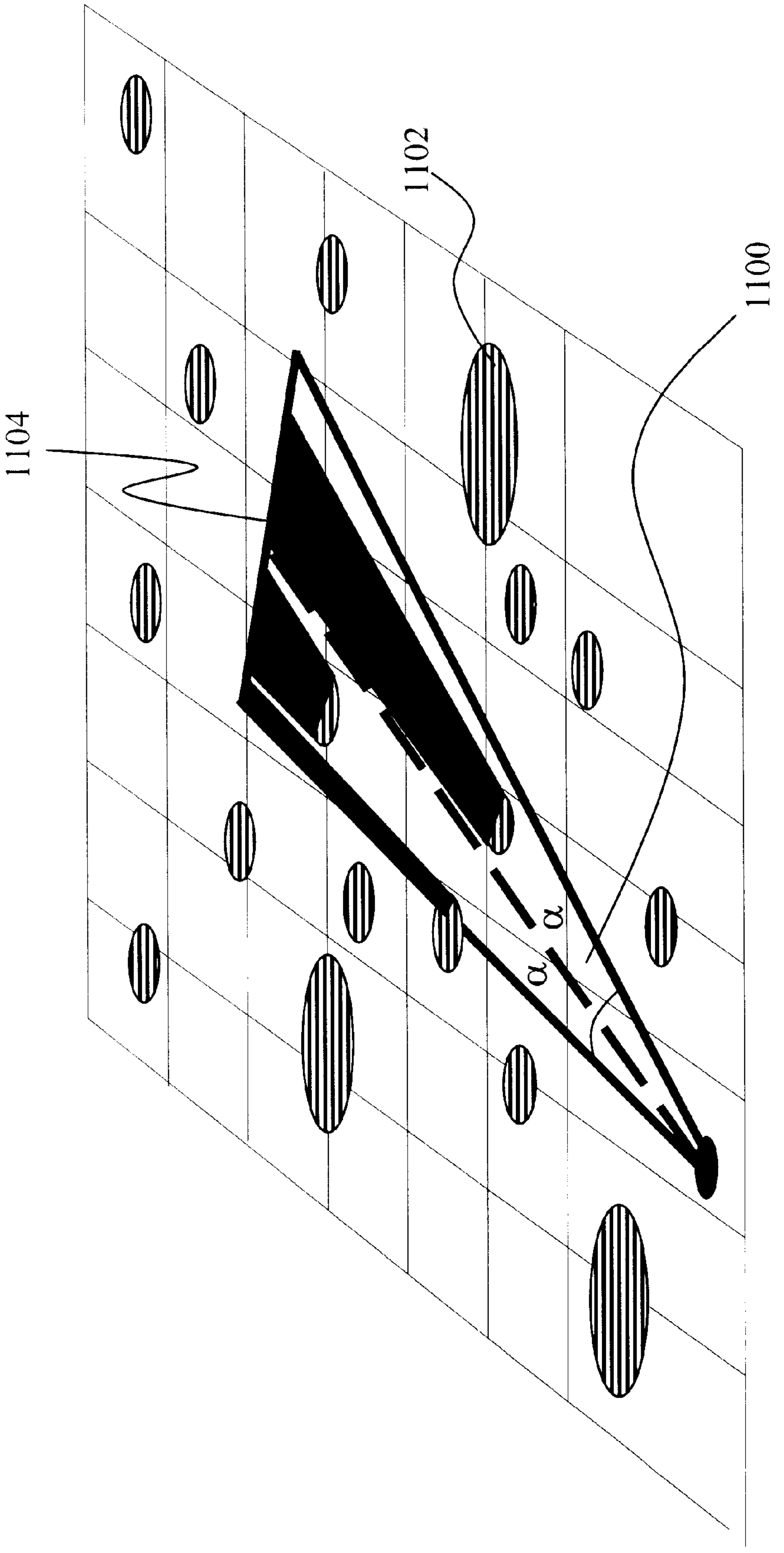
FIG. 11 provides an illustrative example of a two-dimensional field-of-view cone superimposed on a two-dimensional scent array in accordance with the present invention, with opaque view obstructions mapped on the two-dimensional scent array shown to illustrate their interaction with the two-dimensional field-of-view cone.

An example of a two-dimensional field-of-view cone 1100 superimposed on a two-dimensional scent array 900 is shown in FIG. 11. The embodiment of the two-dimensional scent array 900 shown in FIG. 11, also includes representations of view obstructions 1102, as would be generated through the use of a reference terrain elevation map 904. The darkened areas 1104 of the field-of-view cone 1100 represent the areas obstructed from view by the view obstructions 1102. The view obstructions 1102 may be man-made obstacles such as houses or buildings, or natural obstacles such as rocks or terrain variations. Note that although the view obstructions are shown as covering portions of elements, in actuality, they would actually cover at least one complete element. Rather than attempting to provide an accurate representation of the array elements and the view obstructions 1102, FIG. 11 is intended simply to aid in understanding the interaction between the field-of-view cone and the view obstructions 1102.

(8) Specific Embodiment Three

Scent Score Repository as a Scent Map Including a Two-Dimensional Scent Array and a Vertical Scent Array.

Figure 12:
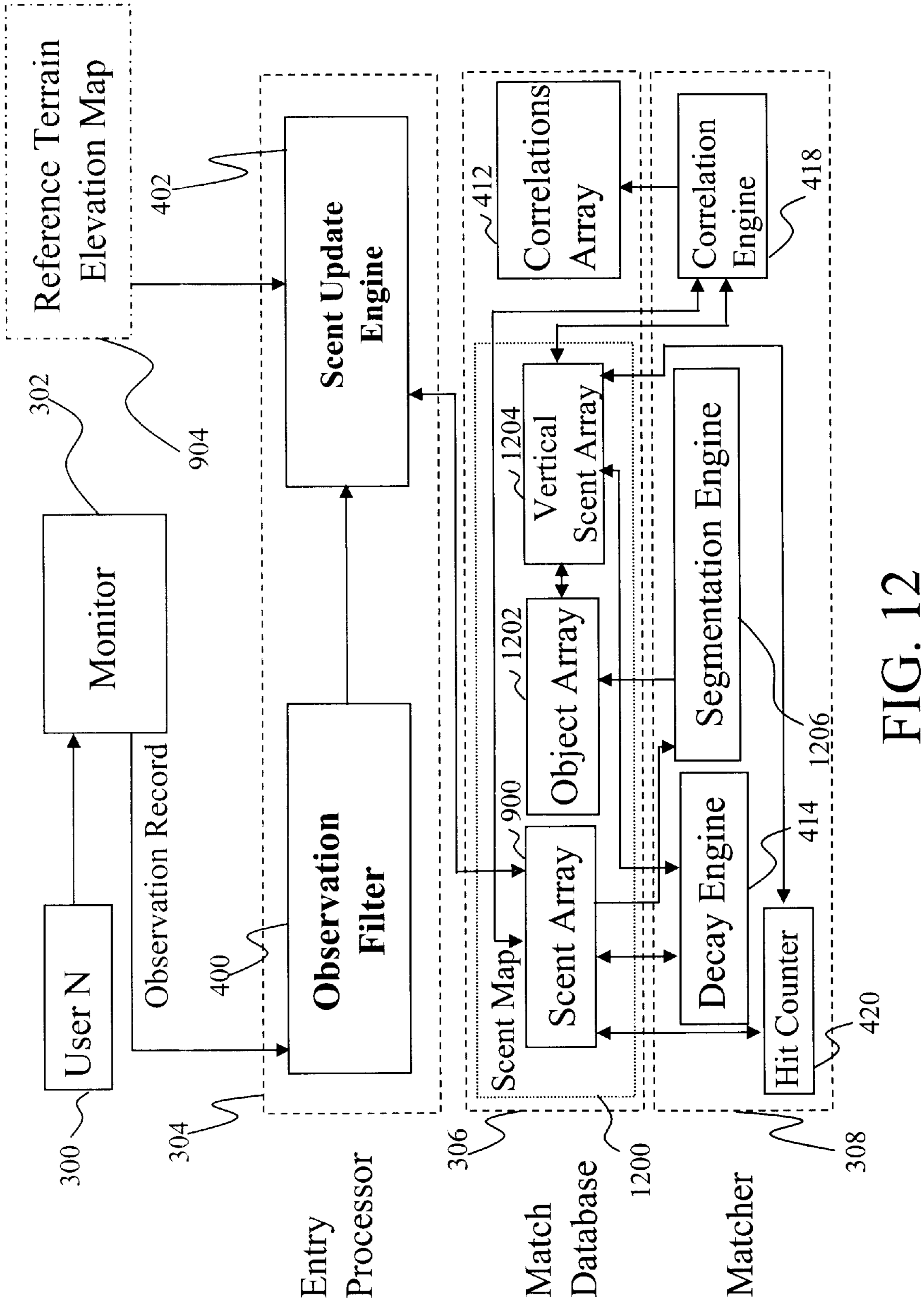
FIG. 12 provides a system detail of a third specific embodiment of the present invention demonstrating the components of the entry processor, the match database, and the matcher wherein the scent score repository includes a scent map having a two-dimensional scent array and a vertical scent array and where scent scores in the two-dimensional array are segmented into objects and placed into an object array.

An embodiment of the present invention incorporating a hybrid two/three dimensional scent array is shown in FIG. 12. The main difference between the embodiment of FIG. 12 and that of FIG. 9, lies in the scent score repository. In FIG. 12, the scent map 1200 includes a scent array 900, similar to that shown in FIG. 10, and discussed relative to FIG. 9. The scent map 1200 of FIG. 12, however, further includes an object array 1202 and a vertical scent array 1204, which are similar to the object array 406 and the vertical scent array 410 shown in FIG. 5 and FIG. 6, respectively, and discussed relative to FIG. 4, except that the object array 1202 of the embodiment of FIG. 12 is not used for the storage of scent scores. Additionally, the matcher 308, as shown in FIG. 12 further includes a segmentation engine 1206 in order to segment elements of the scent array 900 together into objects for entry into the object array 1202.

The segmentation engine 1206 of the matcher 308 is somewhat arbitrarily placed within FIG. 12, and provides a means for associating scent array elements that may be logically grouped; for example, scent array elements corresponding to the location of a structure or other object of interest that spans multiple array elements. Generally, the scent array elements are treated as image elements, and the segmentation engine 1206 uses an object segmentation technique on the array elements, similar to those commonly used with images. There are many different specific segmentation techniques, which may be utilized, depending on the specific needs of a particular embodiment. The groupings of scent array elements corresponding to objects of interest are entered into the object array 1202. In addition to objects that are segmented based on user 300 viewing patterns, objects may also be included in the object array 1202 from a map or other existing source of object-related data. The contents of the object array 1202 are shown in FIG. 13, and include an object identification, an array element list, and a vertical scent array identifier. The vertical scent array 1204 of the embodiment shown in FIG. 12 operates to add a vertical dimension to the objects segmented and stored in the object array 1202. These objects are associated with a vertical array identification, and each vertical array identification may be associated with a plurality of vertical array elements. Thus, for particular objects of interest a third dimension may be added so that elevation may be taken into account with minimal impact on computational requirements (as opposed to using a complete three-dimensional array). Elevations for the vertical scent array 1204 may be chosen as suitable for a particular application, and may be in either linear or angular form with both positive and negative values in suitable increments.

Figure 14:
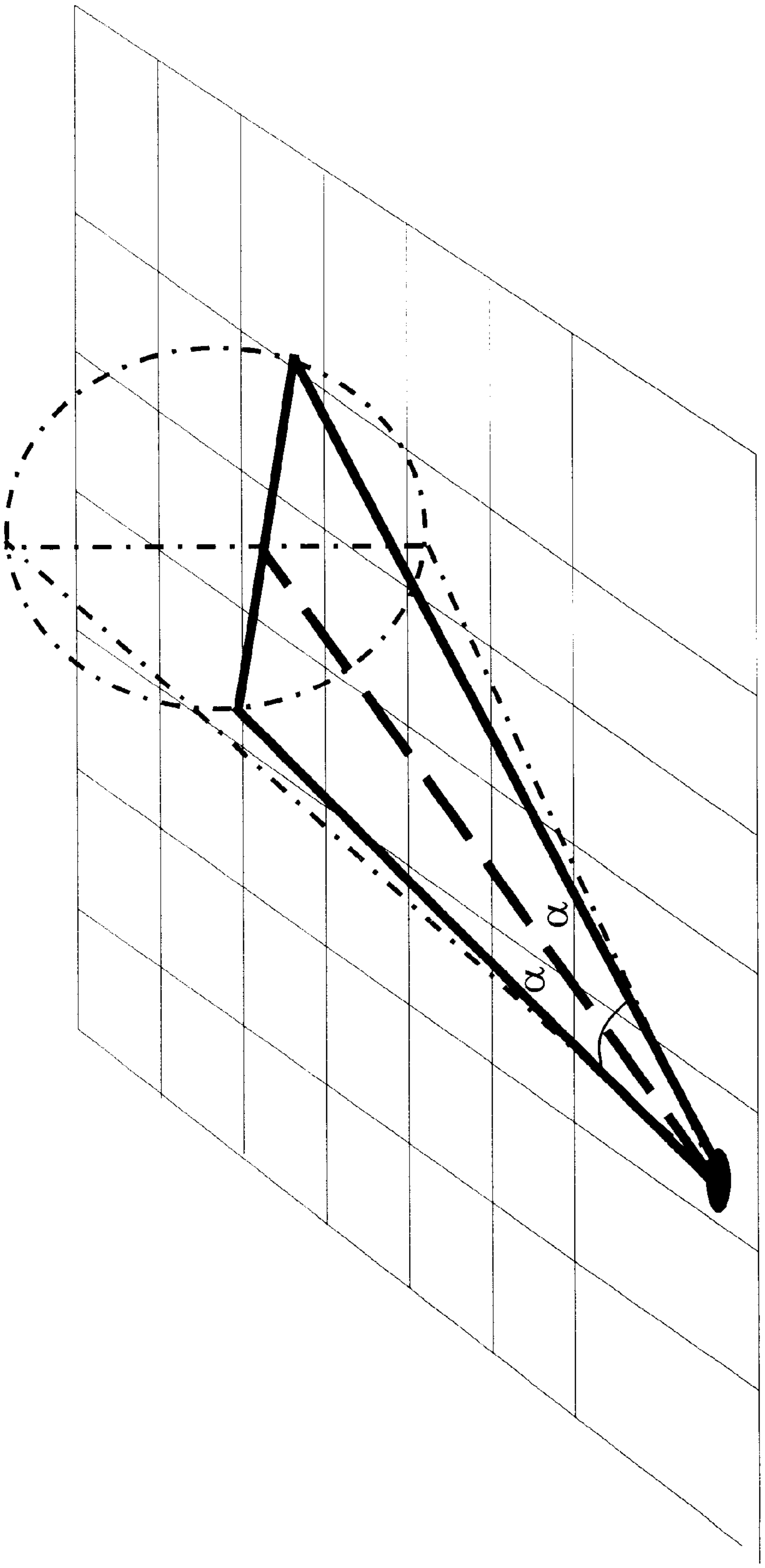
FIG. 14 provides an illustrative example of a three-dimensional field-of-view cone in accordance with the present invention.

FIG. 14 provides an illustration of a field-of-view cone utilizing a vertical angle as well as a horizontal angle. This embodiment of the field-of-view cone may be used in both hybrid two/three-dimensional embodiments of the present invention, as well as in three dimensional embodiments.

It is important to note that although the embodiments of the scent array shown and discussed herein relative to FIG. 9 and FIG. 12 include only horizontal elements, the scent array used in an actual embodiment may be extended to more than two dimensions. In particular, for a model of physical space or in such applications as a video game, it may be desirable to provide a three-dimensional scent array. The main drawback to the use of a three-dimensional array is the need for computational power in order to provide a system that provides near-immediate feedback. Given an array n elements across in all directions, a two-dimensional array includes $n^2$ array elements. Adding a third dimension increases the number of array elements to $n^3$, which adds significantly to the system's computational complexity.

As stated, the specific embodiments described herein relative to FIGS. 4, 9, and 12 are provided as non-limiting examples of applications of the present invention. The embodiment of FIG. 12 is considered to be the best mode of the invention. However, with improving computation and data transfer capabilities, other embodiments may be more favorable. Furthermore, it is noted that although specific combinations of features are discussed herein, it is contemplated that any combination of the features described may be used or adapted to a particular embodiment. There are many possible useful combinations of the features of the present invention, and it is intended that the scope of the present invention not be limited to the embodiments described herein, but that it be afforded the widest meaning commensurate with the novel features and concepts described herein.

What is claimed is:

1. A method for mobile user collaborator discovery among a plurality of users viewing portions of an area comprising the steps of:

(a) collecting a set of user views for the plurality of users, with the set of user views including a plurality of entries, with each entry including a user identity associated with a particular one of the plurality of users, a location within the area for the particular one of the plurality of users, and a view direction including a portion of the area for the particular one of the plurality of users;

(b) uniquely associating at least one scent score from the location of the particular one of the plurality of users to a portion of the area included in the view direction of the particular one of the plurality of users;

(c) storing the at least one scent score from step (b), along with information regarding the identification of the user with which the at least one scent score that was associated in step (b), in a computer memory; and (d) determining a set of scent match scores by correlating the scent scores from at least a portion of the plurality of users to provide a set of users sharing points of common viewing as determined by overlaps in the areas for which scent scores were associated in step (b), whereby overlapping user views are utilized to determine a set of users which have viewed portions of the area in common.

2. A method for mobile user collaborator discovery among a plurality of users viewing portions of an area as set forth in claim 1, wherein the collecting step (a) is performed by monitoring and recording the real-time locations and view directions of the plurality of users, and wherein steps (a) through (d) are repeated a plurality of times.

3. A method for mobile user collaborator discovery among a plurality of users viewing portions of an area as set forth in claim 2, wherein objects having locations are mapped onto the area, and wherein in the scent score associating step (b), the at least one scent score from the particular one of the plurality of users is associated with objects having locations along the view direction of the particular one of the plurality of users, whereby objects such as physical objects including buildings, houses, and terrain features may be used for the scent score association, and whereby the physical objects are the portions of the area included in the view direction with which scent scores are associated.

4. A method for mobile user collaborator discovery among a plurality of users viewing portions of an area as set forth in claim 3, further including the steps of a. establishing at least one measure of similarity between at least two objects indicating a degree of relatedness between the at least two objects, and b. propagating the scent scores between particular objects utilizing the particular measure of similarity between the particular objects to determine a rate for the propagation.

5. A method for mobile user collaborator discovery among a plurality of users viewing portions of an area as set forth in claim 2, wherein a two-dimensional array including a plurality of two-dimensional array elements is mapped onto the area, and wherein in the scent score associating step (b), the at least one scent score from the particular one of the plurality of users is associated with the portion of the two-dimensional array which is mapped onto the portion of the area included in the view direction of the particular one of the plurality of users.

6. A method for mobile user collaborator discovery among a plurality of users viewing portions of an area as set forth in claim 5, wherein portions of the two-dimensional array are segmented into objects based on their scent scores.

7. A method for mobile user collaborator discovery among a plurality of users viewing portions of an area as set forth in claim 6, wherein the objects are each associated with a vertical scent array including at least one vertical scent array element, and wherein at least one scent score is associated with the at least one vertical scent array element, and wherein the scent scores are decayed over time.

8. A method for mobile user collaborator discovery among a plurality of users viewing portions of an area as set forth in claim 7, wherein the at least one scent score includes a short-term scent score and a long-term scent score, and where, the short-term scent score and long-term scent score for the particular viewer associated with the particular area are increased for each subsequent time the particular area lies along the view direction of the particular user, such that the short-term scent score increases more rapidly than the long-term scent score.

9. A method for mobile user collaborator discovery among a plurality of users viewing portions of an area as set forth in claim 8, a. wherein the short-term scent score and long-term scent scores are associated with each particular user according to the following, $$SS=CS$$

$$SL=CL$$

wherein SS represents the short-term scent score, SL represents the long-term scent score, and CS and CL are scalar values chosen as scent score values assigned for the first access of a particular item by a particular user;

b. wherein the short-term scent score and the long-term scent score are increased according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL;

c. wherein the decay is performed according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

10. A method for mobile user collaborator discovery among a plurality of users viewing portions of an area as set forth in claim 9, wherein the correlation of the scent scores between a user a, representing a particular one of the plurality of users, and a user b, representing another of the plurality of users, where item p represents a particular area for which a scent score has been associated, is performed by the following, $$\text{SS\_Match}_{ab_{hybrid}} = \frac{\phi \sum_p \frac{SS_{ap} \times SS_{bp}}{Stot_p}}{\sqrt{\sum_p SS_{ap}^2} \times \sqrt{\sum_p SS_{bp}^2}} + \frac{(1-\phi) \sum_v \frac{SS_{av} \times SS_{bv}}{Stot_v}}{\sqrt{\sum_v SS_{av}^2} \times \sqrt{\sum_v SS_{bv}^2}},$$

-continued $$\text{LL\_Match}_{ab_{hybrid}} = \frac{\phi \sum_p \frac{SL_{ap} \times SL_{bp}}{Stot_p}}{\sqrt{\sum_p SL_{ap}^2} \times \sqrt{\sum_p SL_{bp}^2}} + \frac{(1-\phi) \sum_v \frac{SL_{av} \times SL_{bv}}{Stot_v}}{\sqrt{\sum_v SL_{av}^2} \times \sqrt{\sum_v SL_{bv}^2}}, \text{ and}$$

$$\text{SL\_Match}_{ab_{hybrid}} = \frac{\phi \sum_p \frac{SS_{ap} \times SL_{bp}}{Stot_p}}{\sqrt{\sum_p SS_{ap}^2} \times \sqrt{\sum_p SL_{bp}^2}} + \frac{(1-\phi) \sum_v \frac{SS_{av} \times SL_{bv}}{Stot_v}}{\sqrt{\sum_v SS_{av}^2} \times \sqrt{\sum_v SL_{bv}^2}};$$

where:

SS_Matchab$_{hybrid}$ is the match between the short-term scent scores of users a and b;

LL_Matchab$_{hybrid}$ is the match between the long-term scent scores of users a and b;

SL_Matchab$_{hybrid}$ is the match between the short-term scent score of user a and the long-term scent score of user b;

$\Phi$ is an inclusion factor ranging from 0 to 1, which allows the importance of the vertical scent array elements to be allocated in a weighted manner;

$Stot_p$ and $Stot_v$ are the total number of distinct user scent scores that can be found in the particular array element p and in the particular vertical array element v, respectively;

$SS_{ap}$ and $SS_{av}$ represent the short-term scent score scalars assigned to user a in the particular portion of the particular array element p and in the particular vertical array element v, respectively;

$SL_{ap}$ and $SL_{av}$ represent the long-term scent score scalars assigned to user a in the particular portion of the particular array element p and in the particular vertical array element v, respectively;

$SS_{bp}$ and $SS_{bv}$ represent the short-term scent score scalars assigned to user b in the particular portion of the particular array element p and in the particular vertical array element v, respectively; and $SL_{bp}$ and $SL_{bv}$ represent the long-term scent score scalars assigned to user b in the particular portion of the particular array element p and in the particular vertical array element v, respectively.

11. A method for mobile user collaborator discovery among a plurality of users viewing portions of an area as set forth in claim 2, wherein a three-dimensional array including a plurality of three-dimensional array elements is mapped onto the area, and wherein in the scent score associating step (b), the at least one scent score from the particular one of the plurality of users is associated with the portion of the three-dimensional array which is mapped onto the portion of the area included in the view direction of the particular one of the plurality of users.

12. A method for mobile user collaborator discovery among a plurality of users viewing portions of an area as set forth in claim 2, wherein the scent scores are decayed over time.

13. A method for mobile user collaborator discovery among a plurality of users viewing portions of an area as set forth in claim 2, wherein the at least one scent score associated for each particular user with a particular area in step (b) includes a short-term scent score and a long-term scent score, and where the short-term scent score and long-term scent score for the particular viewer associated with the particular area are increased for each subsequent time the particular area lies along the view direction of the particular user, such that the short-term scent score increases more rapidly than the long-term scent score.

14. A method for mobile user collaborator discovery among a plurality of users viewing portions of an area as set forth in claim 13, wherein the scent scores are decayed over time.

15. A method for mobile user collaborator discovery among a plurality of users viewing portions of an area as set forth in claim 14, wherein the long-term scent scores and the short-term scent scores are decayed over time with a decay rate, such that the long-term scent scores are decayed more slowly than the short-term scent scores.

16. A method for mobile user collaborator discovery among a plurality of users viewing portions of an area as set forth in claim 15, wherein, a. the short-term scent score and long-term scent scores are associated with each particular user according to the following, $$SS=CS$$

$$SL=CL$$

wherein SS represents the short-term scent score, SL represents the long-term scent score, and CS and CL are scalar values chosen as scent score values assigned for the first access of a particular item by a particular user;

b. the short-term scent score and the long-term scent score are increased according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL; and d. the decay is performed according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

17. A method for mobile user collaborator discovery among a plurality of users viewing portions of an area as set forth in claim 16, wherein the correlation of the scent scores between a user a, representing a particular one of the plurality of users, and a user b, representing another of the plurality of users, where item p represents a particular area for which a scent score has been associated, is performed by the following, $$\text{SS\_Match}_{ab} = \frac{\sum_p \frac{SS_{ap} \times SS_{bp}}{Stot_p}}{\sqrt{\sum_p SS_{ap}^2}\sqrt{\sum_p SS_{bp}^2}},$$

-continued $$\text{SL\_Match}_{ab} = \frac{\sum_p \frac{SS_{ap} \times SL_{bp}}{Stot_p}}{\sqrt{\sum_p SS_{ap}^2}\sqrt{\sum_p SL_{bp}^2}}, \text{ and}$$

$$\text{LL\_Match}_{ab} = \frac{\sum_p \frac{SL_{ap} \times SL_{bp}}{Stot_p}}{\sqrt{\sum_p SL_{ap}^2}\sqrt{\sum_p SL_{bp}^2}}, \text{ where}$$

$\text{SS\_Match}_{ab}$ is the match between short-term scent scores of user a and user b;

$\text{SL\_Match}_{ab}$ is the match between the short-term scent score of user a and the long-term scent score of user b;

$\text{LL\_Match}_{ab}$ is the match between the long-term scent scores of users a and b;

$Stot_p$ is the total number of distinct user scent scores that can be found at area p;

$SS_{ap}$ is the short-term scent score assigned to user a at area p; and $SL_{ap}$ is the long-term scent score assigned to user a at area p.

18. A method for mobile user collaborator discovery among a plurality of users viewing portions of an area as set forth in claim 17, wherein objects having locations are mapped onto the area, and wherein in the scent score associating step (b), the at least one scent score from the particular one of the plurality of users is associated with objects having locations along the view direction of the particular one of the plurality of users, whereby objects such as physical objects including buildings, houses, and terrain features may be used for the scent score association, and whereby the physical objects are the portions of the area included in the view direction with which scent scores are associated.

19. A method for mobile user collaborator discovery among a plurality of users viewing portions of an area as set forth in claim 18, wherein the object from which the scent score is diffused is identified as a source object A and the object to which the scent score is diffused is identified as a destination object B, and the scent score diffusion is performed according to, $$\text{if } SS_A > SS_B\text{: } SS'_B = SS_B + (SS_A - SS_B)*L_{AB}*r_S, \text{ and}$$

$$\text{if } SL_A > SL_B\text{: } SL'_B = SL_B + (SL_A - SL_B)*L_{AB}*r_L, \text{ wherein}$$

$SS_A$ represents the short-term scent for a particular user at the source object A, $SS_B$ represents the short-term scent for a particular user at the destination object B, $SL_A$ represents the long-term scent for a particular user at the source object A, $SL_B$ represents the long-term scent for a particular user at the destination object B, $L_{AB}$ represents the measure of similarity between the source object A and the destination object B, $r_S$ provides a short-term scent diffusion rate, and $r_L$ provides a long-term scent diffusion rate.

20. A method for mobile user collaborator discovery among a plurality of users viewing portions of an area as set forth in claim 1, wherein the view direction of each of the plurality of users is in the form of a field-of-view cone having a vertex at the location of, and being centered along, the view direction of the particular one of the plurality of users, whereby the field-of view cone simulates the field-of-view of the user with respect to the area along the view direction.

21. A method for mobile user collaborator discovery among a plurality of users viewing portions of an area as set forth in claim 1, further including the step of filtering the user views to eliminate undesirable user views from the set of user views.

22. A method for mobile user collaborator discovery among a plurality of users viewing portions of an area as set forth in claim 1, wherein the scent scores are represented by scalar values, and further including the step of increasing the scent scores for each particular user in proportion to the number of times a particular portion of the area is included in the direction of view of the particular user.

23. A method for mobile user collaborator discovery among a plurality of users viewing portions of an area as set forth in claim 22, wherein the increasing of the scent scores is such that each particular scent score never exceeds a predetermined maximum value.

24. A method for mobile user collaborator discovery among a plurality of users viewing portions of an area as set forth in claim 1, further including the step of providing each of the plurality of users with information regarding the correlation of their scent scores with the scent scores of others of the plurality of users after step (d).

25. A method for mobile user collaborator discovery among a plurality of users viewing portions of an area as set forth in claim 1, wherein each of the plurality of users is provided a method for messaging to allow interaction between the plurality of users.

26. A system for mobile user collaborator discovery among a plurality of users viewing portions of an area including:

a. at least one activity monitor for collecting a set of user views for the plurality of users, with the set of user views including a plurality of entries, with each entry including a user identity associated with a particular one of the plurality of users, a location within the area for the particular one of the plurality of users, and a view direction including a portion of the area for the particular one of the plurality of users;

b. an entry processor connected to the activity monitor to receive the set of user views for the plurality of users, said entry processor operative to uniquely associate at least one scent score from the location of the particular one of the plurality of users to a portion of the area included in the view direction of the particular one of the plurality of users;

c. a match database connected to the entry processor to receive and store the at least one scent score, along with information regarding the identification of the user with which the at least one scent score was associated;

d. a matcher connected to the match database to receive the at least one scent score, along with the information regarding the identification of the user with which the at least one scent score was associated, and to correlate the scent scores from at least a portion of the plurality of users to provide a set of users sharing points of common viewing as determined by overlaps in the areas for which the scent scores were associated by the entry processor, whereby overlapping user views are used to determine a set of users which have viewed portions of the area in common.

27. A system for mobile user collaborator discovery among a plurality of users viewing portions of an area as set forth in claim 26, wherein the user views collected by the activity monitor are the real-time locations and view directions of the plurality of users, and where the system operates continually to provide a continual update of the at least one scent score.

28. A system for mobile user collaborator discovery among a plurality of users viewing portions of an area as set forth in claim 27, wherein objects having locations are mapped onto the area, and wherein the at least one scent score from the particular one of the plurality of users is associated with objects having locations along the view direction of the particular one of the plurality of users, whereby objects such as physical objects including buildings, houses, and terrain features may be used for the scent score association, and whereby the physical objects are the portions of the area included in the view direction with which scent scores are associated.

29. A system for mobile user collaborator discovery among a plurality of users viewing portions of an area as set forth in claim 28, wherein at least one measure of similarity is established between at least two objects indicating a degree of relatedness between the at least two objects, and wherein the scent scores are propagated between particular objects utilizing the particular measure of similarity between the particular objects to determine a rate for the propagation.

30. A system for mobile user collaborator discovery among a plurality of users viewing portions of an area as set forth in claim 27, wherein a two-dimensional array including a plurality of two-dimensional array elements is mapped onto the area, and wherein in the at least one scent score from the particular one of the plurality of users is associated with a portion of the two-dimensional array which is mapped onto the portion of the area included in the view direction of the particular one of the plurality of users.

31. A system for mobile user collaborator discovery among a plurality of users viewing portions of an area as set forth in claim 30, further including means for segmenting portions of the two-dimensional array into objects based on their scent scores.

32. A system for mobile user collaborator discovery among a plurality of users viewing portions of an area as set forth in claim 31, wherein the objects are each associated with a vertical scent array including at least one vertical scent array element, and wherein at least one scent score is associated with the at least one vertical scent array element, and wherein the scent scores are decayed over time.

33. A system for mobile user collaborator discovery among a plurality of users viewing portions of an area as set forth in claim 32, wherein the at least one scent score includes a short-term scent score and a long-term scent score, and where, the short-term scent score and long-term scent score for the particular viewer associated with the particular area are increased for each subsequent time the particular area lies along the view direction of the particular user, such that the short-term scent score increases more rapidly than the long-term scent score.

34. A system for mobile user collaborator discovery among a plurality of users viewing portions of an area as set forth in claim 33, wherein, a. the short-term scent score and long-term scent scores are associated, by the entry processor, with each particular user according to the following, $$SS=CS$$

$$SL=CL$$

wherein SS represents the short-term scent score, SL represents the long-term scent score, and CS and CL are scalar values chosen as scent score values assigned for the first access of a particular item by a particular user;

b. the short-term scent score and the long-term scent score are increased, by the scent update engine, according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL; and c. the decay is performed, by the means for decaying, according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

35. A system for mobile user collaborator discovery among a plurality of users viewing portions of an area as set forth in claim 34, wherein the correlation of the scent scores between a user a, representing a particular one of the plurality of users, and a user b, representing another of the plurality of users, where item p represents a particular area for which a scent score has been associated, is performed by the following, $$SS\_Match_{ab_{hybrid}} = \frac{\phi\sum_p \frac{SS_{ap}\times SS_{bp}}{Stot_p}}{\sqrt{\sum_p SS_{ap}^2}\times\sqrt{\sum_p SS_{bp}^2}} + \frac{(1-\phi)\sum_v \frac{SS_{av}\times SS_{bv}}{Stot_v}}{\sqrt{\sum_v SS_{av}^2}\times\sqrt{\sum_v SS_{bv}^2}},$$

$$LL\_Match_{ab_{hybrid}} = \frac{\phi\sum_p \frac{SL_{ap}\times SL_{bp}}{Stot_p}}{\sqrt{\sum_p SL_{ap}^2}\times\sqrt{\sum_p SL_{bp}^2}} + \frac{(1-\phi)\sum_v \frac{SL_{av}\times SL_{bv}}{Stot_v}}{\sqrt{\sum_v SL_{av}^2}\times\sqrt{\sum_v SL_{bv}^2}}, \text{ and}$$

$$SL\_Match_{ab_{hybrid}} = \frac{\phi\sum_p \frac{SS_{ap}\times SL_{bp}}{Stot_p}}{\sqrt{\sum_p SS_{ap}^2}\times\sqrt{\sum_p SL_{bp}^2}} + \frac{(1-\phi)\sum_v \frac{SS_{av}\times SL_{bv}}{Stot_v}}{\sqrt{\sum_v SS_{av}^2}\times\sqrt{\sum_v SL_{bv}^2}};$$

where:

$SS\_Matchab_{hybrid}$ is the match between the short-term scent scores of users a and b;

$LL\_Matchab_{hybrid}$ is the match between the long-term scent scores of users a and b;

$SL\_Matchab_{hybrid}$ is the match between the short-term scent score of user a and the long-term scent score of user b;

Φ is an inclusion factor ranging from 0 to 1, which allows the importance of the vertical scent array elements to be allocated in a weighted manner;

$Stot_p$ and $Stot_v$ are the total number of distinct user scent scores that can be found in the particular array element p and in the particular vertical array element v, respectively;

$SS_{ap}$ and $SS_{av}$ represent the short-term scent score scalars assigned to user a in the particular portion of the particular array element p and in the particular vertical array element v, respectively;

$SL_{ap}$ and $SL_{av}$ represent the long-term scent score scalars assigned to user a in the particular portion of the particular array element p and in the particular vertical array element v, respectively;

$SS_{bp}$ and $SS_{bv}$ represent the short-term scent score scalars assigned to user b in the particular portion of the particular array element p and in the particular vertical array element v, respectively; and $SL_{bp}$ and $SL_{bv}$ represent the long-term scent score scalars assigned to user b in the particular portion of the particular array element p and in the particular vertical array element v, respectively.

36. A system for mobile user collaborator discovery among a plurality of users as set forth in claim 27, wherein a three-dimensional array including a plurality of three-dimensional array elements is mapped onto the area, and wherein the at least one scent score from the particular one of the plurality of users is associated with the portion of the three-dimensional array which is mapped onto the portion of the area included in the view direction of the particular one of the plurality of users.

37. A system for mobile user collaborator discovery among a plurality of users viewing portions of an area as set forth in claim 27, further including a decay engine which decays the scent scores over time.

38. A system for mobile user collaborator discovery among a plurality of users viewing portions of an area as set forth in claim 27, wherein the at least one scent score associated for each particular user with a particular area includes a short-term scent score and a long-term scent score, and where the short-term scent score and the long-term scent score for the particular viewer associated with the particular area are increased by the scent update engine for each subsequent time the particular area lies along the view direction of the particular user, such that the short-term scent score increases more rapidly than the long-term scent score.

39. A system for mobile user collaborator discovery among a plurality of users viewing portions of an area as set forth in claim 38, further including a decay engine which decays the scent scores over time.

40. A system for mobile user collaborator discovery among a plurality of users viewing portions of an area as set forth in claim 39, further including means for decaying the long-term scent scores and the short-term scent scores over time with a decay rate, such that the long-term scent scores are decayed more slowly than the short-term scent scores.

41. A system for mobile user collaborator discovery among a plurality of users viewing portions of an area as set forth in claim 40, wherein a. the short-term scent score and long-term scent scores are associated, by the entry processor, with each particular user according to the following, $$SS=CS$$

$$SL=CL$$

wherein SS represents the short-term scent score, SL represents the long-term scent score, and CS and CL are scalar values chosen as scent score values assigned for the first access of a particular item by a particular user;

b. the short-term scent score and the long-term scent score are increased, by the scent update engine, according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL; and c. the decay is performed, by the means for decaying, according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

42. A system for mobile user collaborator discovery among a plurality of users viewing portions of an area as set forth in claim 41, wherein the correlation of the scent scores between a user a, representing a particular one of the plurality of users, and a user b, representing another of the plurality of users, where item p represents a particular area for which a scent score has been associated, is performed by the following, $$SS\_Match_{ab} = \frac{\sum_p \frac{SS_{ap} \times SS_{bp}}{Stot_p}}{\sqrt{\sum_p SS_{ap}^2}\sqrt{\sum_p SS_{bp}^2}},$$

$$SL\_Match_{ab} = \frac{\sum_p \frac{SS_{ap} \times SL_{bp}}{Stot_p}}{\sqrt{\sum_p SS_{ap}^2}\sqrt{\sum_p SL_{bp}^2}}, \text{ and}$$

$$LL\_Match_{ab} = \frac{\sum_p \frac{SL_{ap} \times SL_{bp}}{Stot_p}}{\sqrt{\sum_p SL_{ap}^2}\sqrt{\sum_p SL_{bp}^2}}, \text{ where}$$

$SS\_Match_{ab}$ is the match between short-term scent scores of user a and user b;

$SL\_Match_{ab}$ is the match between the short-term scent score of user a and the long-term scent score of user b;

$LL\_Match_{ab}$ is the match between the long-term scent scores of users a and b;

$Stot_p$ is the total number of distinct user scent scores that can be found at area p;

$SS_{ap}$ is the short-term scent score assigned to user a at area p; and $SL_{ap}$ is the long-term scent score assigned to user a at area p.

43. A system for mobile user collaborator discovery among a plurality of users viewing portions of an area as set forth in claim 42, wherein objects having locations are mapped onto the area, and wherein the at least one scent score from the particular one of the plurality of users is associated with objects having locations along the view direction of the particular one of the plurality of users, whereby objects such as physical objects including buildings, houses, and terrain features may be used for the scent score association, and whereby the physical objects are the portions of the area included in the view direction with which scent scores are associated.

44. A system for mobile user collaborator discovery among a plurality of users viewing portions of an area as set forth in claim 43, wherein the object from which the scent score is diffused is identified as a source object A and the object to which the scent score is diffused is identified as a destination object B, and the scent score diffusion is performed according to, $$\text{if } SS_A>SS_B\text{: } SS'_B=SS_B+(SS_A-SS_B)*L_{AB}*r_S, \text{ and}$$

$$\text{if } SL_A>SL_B\text{: } SL'_B=SL_B+(SL_A-SL_B)*L_{AB}*r_L, \text{ wherein}$$

$SS_A$ represents the short-term scent for a particular user at the source object A, $SS_B$ represents the short-term scent for a particular user at the destination object B, $SL_A$ represents the long-term scent for a particular user at the source object A, $SL_B$ represents the long-term scent for a particular user at the destination object B, $L_{AB}$ represents the measure of similarity between the source object A and the destination object B, $r_S$ provides a short-term scent diffusion rate, and $r_L$ provides a long-term scent diffusion rate.

45. A system for mobile user collaborator discovery among a plurality of users viewing portions of an area as set forth in claim 26, wherein the view direction of each of the plurality of users is in the form of a field-of-view cone having a vertex at the location of, and being centered along, the view direction of the particular one of the plurality of users, whereby the field-of-view cone simulates the field-of-view of the user with respect to the area along the view direction.

46. A system for mobile user collaborator discovery among a plurality of users viewing portions of an area as set forth in claim 26, wherein the entry processor filters the user views to eliminate undesirable user views from the set of user views.

47. A system for mobile user collaborator discovery among a plurality of users viewing portions of an area as set forth in claim 26, wherein the scent scores are represented by scalar values, and where the entry processor includes a scent update engine which increases the scent scores for each particular user in proportion to the number of times a particular portion of the area is included in the direction of view of a particular user.

48. A system for mobile user collaborator discovery among a plurality of users viewing portions of an area as set forth in claim 47, further including means for limiting the scent scores to a maximum scent score value such that when a particular scent score reaches the maximum scent score value, it ceases to increase.

49. A system for mobile user collaborator discovery among a plurality of users viewing portions of an area as set forth in claim 26, further including means for providing the plurality of users with information regarding the correlation of their scent scores with the scent scores of others of the plurality of users.

50. A system for mobile user collaborator discovery among a plurality of users viewing portions of an area as set forth in claim 26, further including means for allowing at least a portion of the plurality of users to communicate between each other.

* * * * *

UNITED STATES PATENT AND TRADEMARK OFFICE

CERTIFICATE OF CORRECTION

PATENT NO. : 6,507,802 B1 
APPLICATION NO. : 09/505266
DATED : January 14, 2003
INVENTOR(S) : David W. Payton and Mike Daily It is certified that error appears in the above-identified patent and that said Letters Patent is hereby corrected as shown below:

Column 4, lines 21-55; column 5, lines 25 - 40; column 7, line 50 - column 8, line 7; column 8, lines 44 - 60; column 18, line 39 - column 19, line 7; in the formulas referenced above, each occurrence of the symbol “\(\%\)” should be removed.

Column 4, lines 21 - 55; in the three listed formulas, the subscripted variables for the second half of each formula reading “p” should read --v-- and appear as follows:

$$SS\_Match_{ab_{hybrid}} = \frac{\phi\sum_p \frac{SS_{ap} x SS_{bp}}{Stot_p}}{\sqrt{\sum_p SS_{ap}^2} x \sqrt{\sum_p SS_{bp}^2}} + \frac{(1-\phi)\sum_v \frac{SS_{av} x SS_{bv}}{Stot_v}}{\sqrt{\sum_v SS_{av}^2} x \sqrt{\sum_v SS_{bv}^2}}$$

$$LL\_Match_{ab_{hybrid}} = \frac{\phi\sum_p \frac{SL_{ap} x SL_{bp}}{Stot_p}}{\sqrt{\sum_p SL_{ap}^2} x \sqrt{\sum_p SL_{bp}^2}} + \frac{(1-\phi)\sum_v \frac{SL_{av} x SL_{bv}}{Stot_v}}{\sqrt{\sum_v SL_{av}^2} x \sqrt{\sum_v SL_{bv}^2}}$$

$$SL\_Match_{ab_{hybrid}} = \frac{\phi\sum_p \frac{SS_{ap} x SL_{bp}}{Stot_p}}{\sqrt{\sum_p SS_{ap}^2} x \sqrt{\sum_p SL_{bp}^2}} + \frac{(1-\phi)\sum_v \frac{SS_{av} x SL_{bv}}{Stot_v}}{\sqrt{\sum_v SS_{av}^2} x \sqrt{\sum_v SL_{bv}^2}}$$

Column 7, line 55 - column 8, line 7; in the two formulas listed, the variables for the second half of each formula should reading “p” should read --v--, and appear as follows:

$$SS\_Match_{ab_{hybrid}} = \frac{\phi\sum_p \frac{SS_{ap} x SS_{bp}}{Stot_p}}{\sqrt{\sum_p SS_{ap}^2} x \sqrt{\sum_p SS_{bp}^2}} + \frac{(1-\phi)\sum_v \frac{SS_{av} x SS_{bv}}{Stot_v}}{\sqrt{\sum_v SS_{av}^2} x \sqrt{\sum_v SS_{bv}^2}}$$

$$LL\_Match_{ab_{hybrid}} = \frac{\phi\sum_p \frac{SL_{ap} x SL_{bp}}{Stot_p}}{\sqrt{\sum_p SL_{ap}^2} x \sqrt{\sum_p SL_{bp}^2}} + \frac{(1-\phi)\sum_v \frac{SL_{av} x SL_{bv}}{Stot_v}}{\sqrt{\sum_v SL_{av}^2} x \sqrt{\sum_v SL_{bv}^2}}$$

UNITED STATES PATENT AND TRADEMARK OFFICE

CERTIFICATE OF CORRECTION

PATENT NO. : 6,507,802 B1 
APPLICATION NO. : 09/505266
DATED : January 14, 2003
INVENTOR(S) : David W. Payton and Mike Daily It is certified that error appears in the above-identified patent and that said Letters Patent is hereby corrected as shown below:

Column 18, line 45 - colum 19, line 7; in the three listed formulas, the subscripted variables for the second half of the formulas reading "p" should read --v-- and appear as follows:

$$SS\_Match_{ab_{hybrid}} = \frac{\phi \sum_{p} \frac{SS_{ap} x SS_{bp}}{Stot_p}}{\sqrt{\sum_{p} SS_{ap}^2} x \sqrt{\sum_{p} SS_{bp}^2}} + \frac{(1-\phi) \sum_{v} \frac{SS_{av} x SS_{bv}}{Stot_v}}{\sqrt{\sum_{v} SS_{av}^2} x \sqrt{\sum_{v} SS_{bv}^2}}$$

$$LL\_Match_{ab_{hybrid}} = \frac{\phi \sum_{p} \frac{SL_{ap} x SL_{bp}}{Stot_p}}{\sqrt{\sum_{p} SL_{ap}^2} x \sqrt{\sum_{p} SL_{bp}^2}} + \frac{(1-\phi) \sum_{v} \frac{SL_{av} x SL_{bv}}{Stot_v}}{\sqrt{\sum_{v} SL_{av}^2} x \sqrt{\sum_{v} SL_{bv}^2}}$$

$$SL\_Match_{ab_{hybrid}} = \frac{\phi \sum_{p} \frac{SS_{ap} x SL_{bp}}{Stot_p}}{\sqrt{\sum_{p} SS_{ap}^2} x \sqrt{\sum_{p} SL_{bp}^2}} + \frac{(1-\phi) \sum_{v} \frac{SS_{av} x SL_{bv}}{Stot_v}}{\sqrt{\sum_{v} SS_{av}^2} x \sqrt{\sum_{v} SL_{bv}^2}}$$

Column 8, after the second formula ending on line 7 and before "where:" on line 8, an additional equation should appear, reading as follows:

$$SL\_Match_{ab_{hybrid}} = \frac{\phi \sum_{p} \frac{SS_{ap} x SL_{bp}}{Stot_p}}{\sqrt{\sum_{p} SS_{ap}^2} x \sqrt{\sum_{p} SL_{bp}^2}} + \frac{(1-\phi) \sum_{v} \frac{SS_{av} x SL_{bv}}{Stot_v}}{\sqrt{\sum_{v} SS_{av}^2} x \sqrt{\sum_{v} SL_{bv}^2}}$$

Signed and Sealed this

Second Day of January, 2007

JON W. DUDAS
*Director of the United States Patent and Trademark Office*